(12) United States Patent
Lee

(10) Patent No.: US 9,966,114 B2
(45) Date of Patent: May 8, 2018

(54) MOBILE TERMINAL AND METHOD OF CONTROLLING THEREFOR

(71) Applicant: LG ELECTRONICS INC., Seoul (KR)

(72) Inventor: Junhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/867,815

(22) Filed: Sep. 28, 2015

(65) Prior Publication Data

US 2016/0358631 A1 Dec. 8, 2016

(30) Foreign Application Priority Data

Jun. 3, 2015 (KR) ........................ 10-2015-0078380

(51) Int. Cl.
*G11B 27/00* (2006.01)
*H04N 5/93* (2006.01)
*G11B 27/10* (2006.01)
*G06F 3/0484* (2013.01)
*G06F 3/0488* (2013.01)
*G11B 27/34* (2006.01)
*G11B 27/031* (2006.01)
(Continued)

(52) U.S. Cl.
CPC .......... *G11B 27/105* (2013.01); *G06F 3/0488* (2013.01); *G06F 3/04842* (2013.01); *G11B 27/031* (2013.01); *G11B 27/34* (2013.01); *G06F 3/016* (2013.01); *G06F 3/04883* (2013.01); *G06F 3/04886* (2013.01)

(58) Field of Classification Search
CPC ............. G11B 27/00; H04N 5/93; H04N 9/80

USPC ................ 386/278, 280, 282, 281, 239, 248
See application file for complete search history.

(56) References Cited

U.S. PATENT DOCUMENTS 8,842,975 B2 * 9/2014 Cho ....................... G11B 20/10
386/282
8,937,620 B1 * 1/2015 Teller ...................... G06T 13/80
345/467
9,318,151 B2 * 4/2016 Lee ...................... G11B 27/034
(Continued)

FOREIGN PATENT DOCUMENTS

JP H10-164478 A 6/1998
JP 2011-526087 A 9/2011

OTHER PUBLICATIONS

International Search Report dated Feb. 3, 2016 issued in Application No. PCT/KR2015/010735.

*Primary Examiner* — Daquan Zhao
(74) *Attorney, Agent, or Firm* — Ked & Associates LLP

(57) ABSTRACT

The present invention relates to a mobile terminal and a method of controlling therefor. To achieve these objects and other advantages and in accordance with the purpose of the invention, as embodied and broadly described herein, according to one embodiment, a mobile terminal, comprising a touch screen to display a video list that includes at least one video; and a controller configured to display a timeline corresponding to the at least one video according to a first input at the video list, wherein the timeline includes at least one of a start point indicator and an end point indicator to identify an editing section of the at least one video, and, play, on the touch screen, the editing section of the at least one video contained in the video list based on a second input at the video list.

24 Claims, 29 Drawing Sheets

(51) Int. Cl.
*H04N 9/80* (2006.01)
*G06F 3/01* (2006.01)

(56) References Cited

U.S. PATENT DOCUMENTS

| | | | |
|---|---|---|---|
| 2008/0136790 A1* | 6/2008 | Hio | G06F 3/04817 |
| | | | 345/173 |
| 2012/0210228 A1 | 8/2012 | Wang et al. | |
| 2013/0174039 A1* | 7/2013 | Lee | G06F 17/30852 |
| | | | 715/723 |
| 2015/0325271 A1* | 11/2015 | Kim | G11B 27/11 |
| | | | 386/230 |

* cited by examiner

FIG. 22
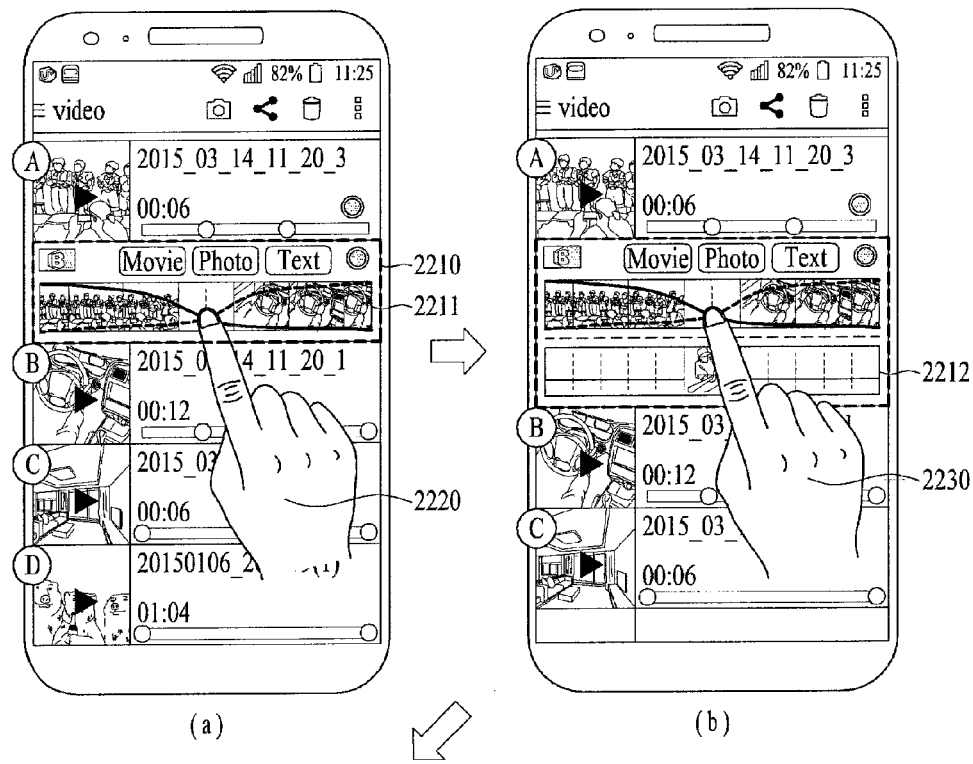
(a)    (b)
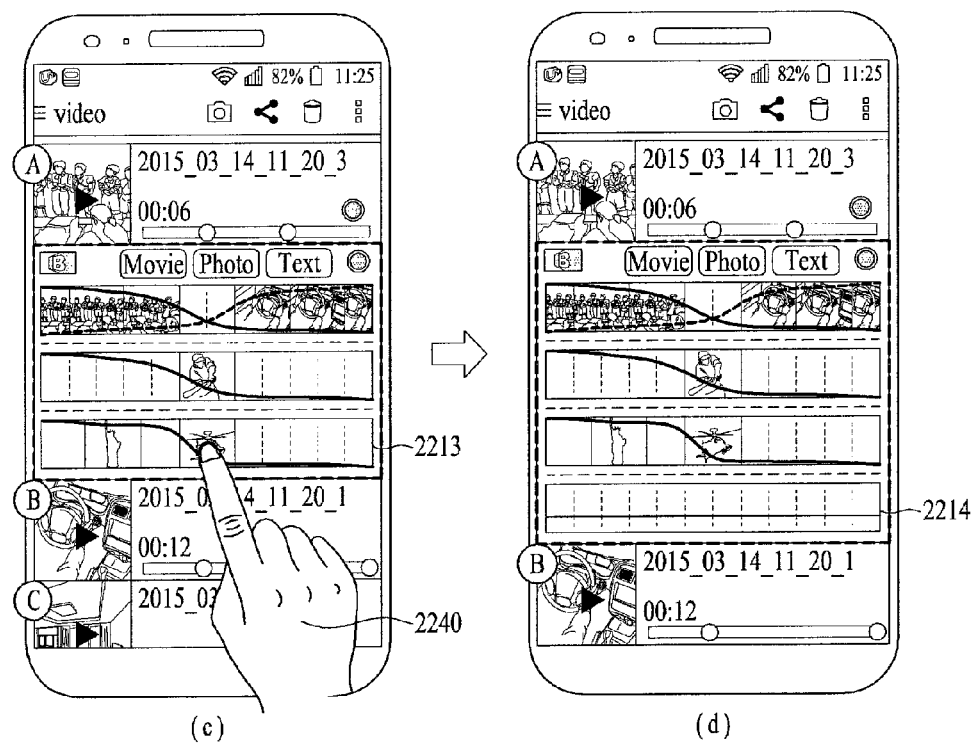
(c)    (d)

(a) (b)

(a) (b)

MOBILE TERMINAL AND METHOD OF CONTROLLING THEREFOR

CROSS-REFERENCE TO RELATED APPLICATION

This application claims the benefit of the Korean Patent Application No. 10-2015-0078380, filed on Jun. 3, 2015, which is hereby incorporated by reference as if fully set forth herein.

BACKGROUND

1. Field

The present invention relates to a mobile terminal and a method of controlling therefor.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

It was impossible to edit a video on a list on which at least one video are displayed. In order to edit a video, it was required to execute a separate video editing program.

BRIEF DESCRIPTION OF THE DRAWINGS

Embodiments will be described in detail with reference to the following drawings in which like reference numerals refer to like elements and wherein:

FIG. 22 shows diagrams for a fourth embodiment of providing an additional editing option for scene transition in the middle of editing at least one video of a mobile terminal according to the present invention;

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
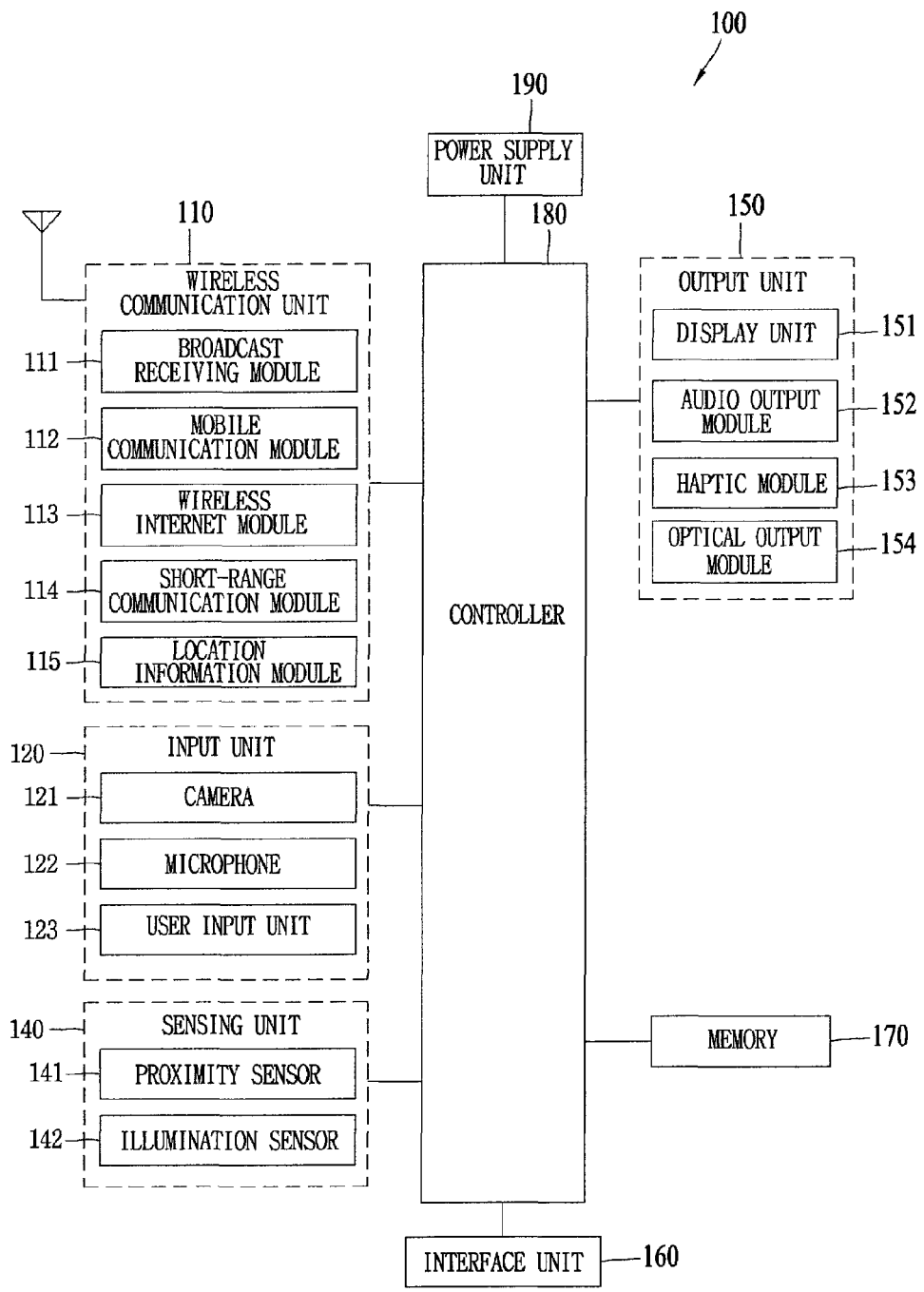
FIG. 1A is a block diagram of a mobile terminal in accordance with the present disclosure.
Figure 1B:
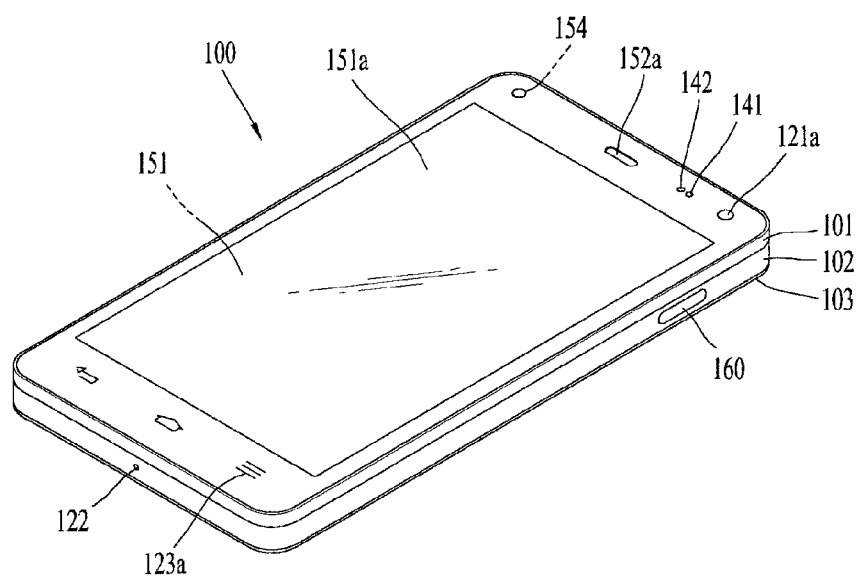
FIGS. 1B and 1C are conceptual views of one example of the mobile terminal, viewed from different directions.
Figure 1C:
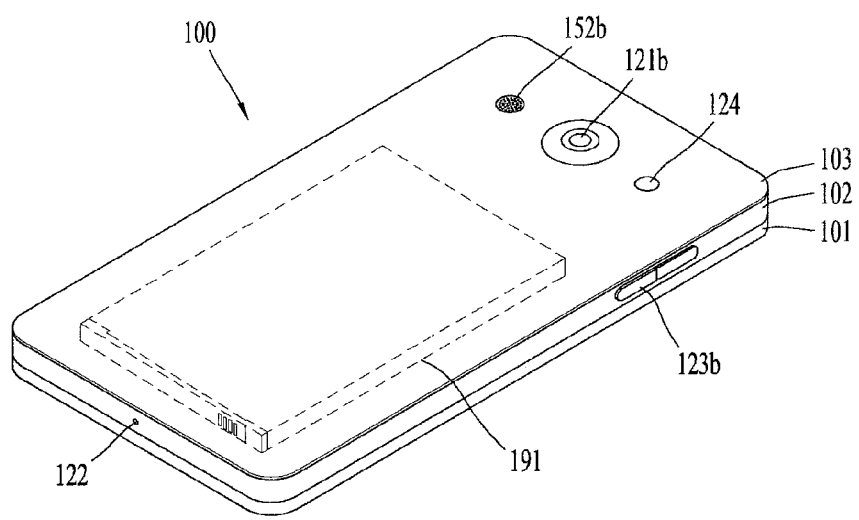

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information, and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned configuration elements can operate in a manner of cooperating with each other to implement an operation of a mobile terminal, a control of the mobile terminal or a method of controlling the mobile terminal according to various embodiments described in the following. And, the operation of the mobile terminal, the control of the mobile terminal or the method of controlling the mobile terminal can be implemented on the mobile terminal in a manner of executing at least one or more application programs stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support transition among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152a/152b, a proximity sensor 141, an illumination sensor 142, an optical output unit 154, a first and a second camera 121a/121b, a first and a second operation unit 123a/123b, a microphone 122, an interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, information processed by a mobile terminal can be displayed using a flexible display. Regarding this, it shall be described in more detail with reference to the attached drawing in the following.

Figure 2:
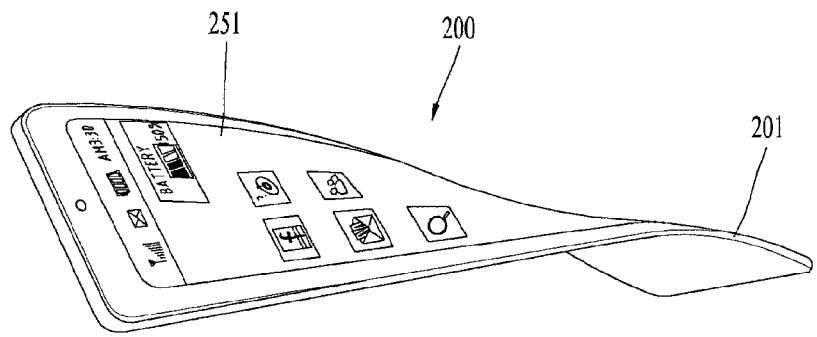
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
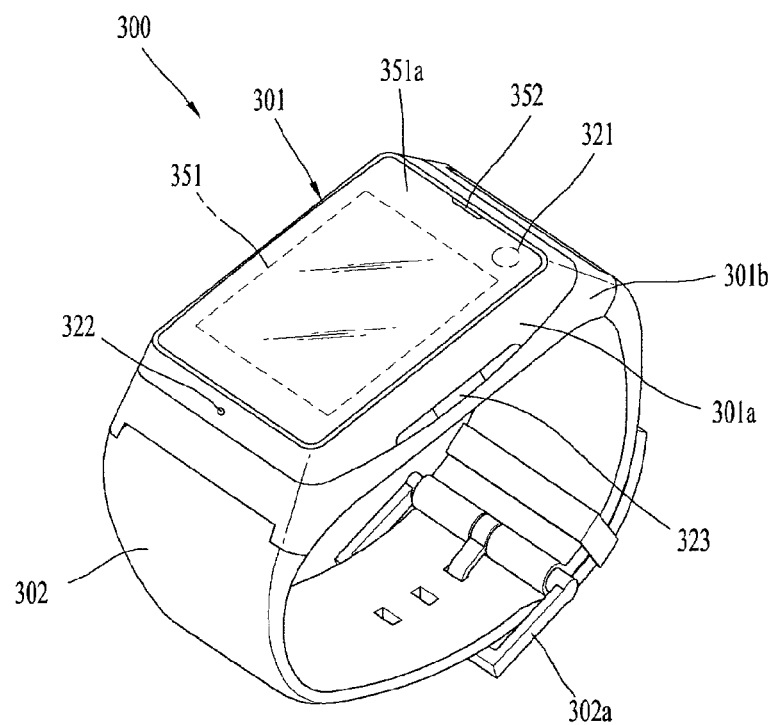
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
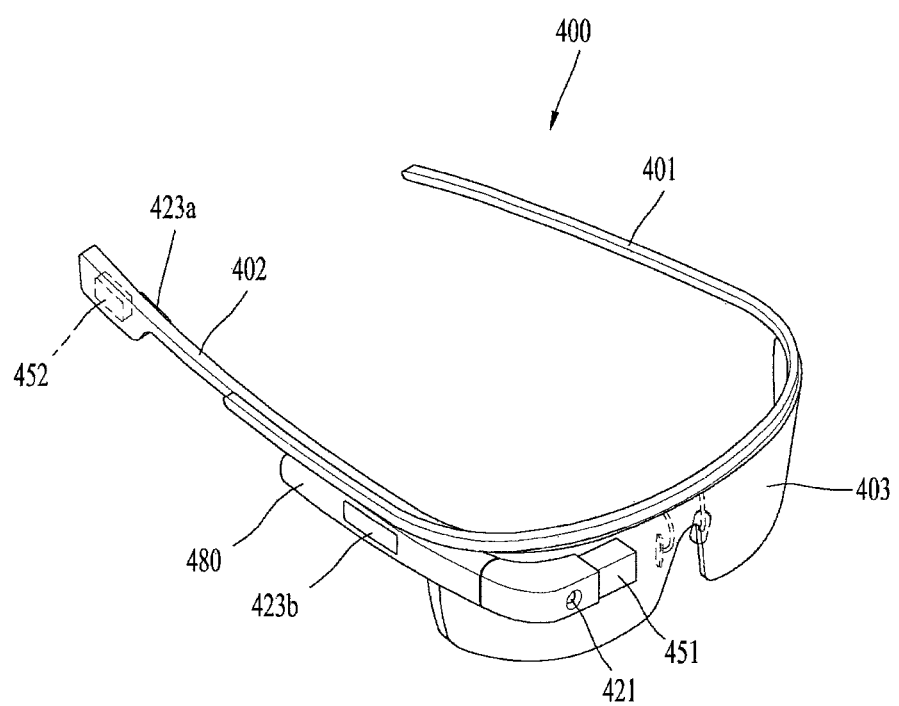
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g. 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™' Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g. a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g. Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, embodiments of the present invention are explained with reference to FIG. 5 to FIG. 36. In explaining and understanding the embodiments of the present invention, it may refer to the contents mentioned earlier in FIG. 1 to FIG. 4. And, the aforementioned mobile terminal may correspond to a mobile terminal according to one embodiment of the present invention.

In one embodiment of the present specification, operations performed by a mobile terminal can be controlled by the controller 180. For clarity, assume that the operations are commonly performed or controlled by the mobile terminal in the following drawings and explanation.

Figure 5:
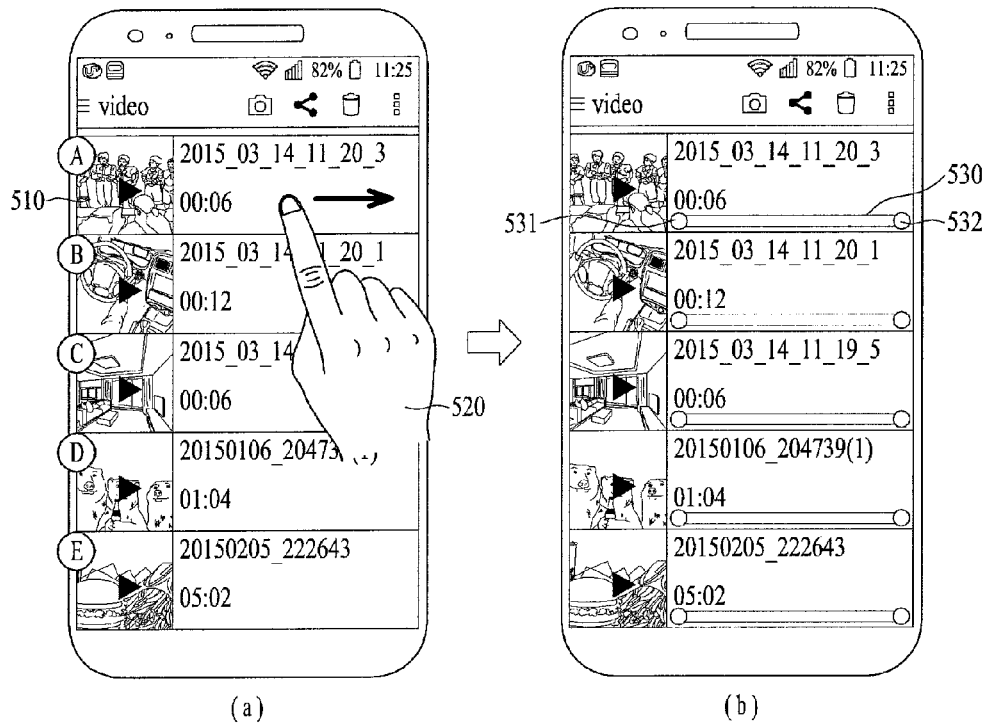
FIG. 5 shows diagrams for an embodiment of displaying a timeline in case of receiving an input on a video list of a mobile terminal according to the present invention.

FIG. 5 is a diagram for an embodiment of displaying a timeline in case of receiving an input signal on a video list 510 of a mobile terminal according to the present invention.

First of all, the mobile terminal can execute a video application by an input (not depicted) of a user. In this case, the video application may correspond to an application providing a video stored in advance or captured videos. In case of executing the video application, the mobile terminal can display a video list 510 on which at least one video are displayed. As shown in FIG. 5 (a), the video list 510 can display a thumbnail image representing each of at least one video and video information. For example, if an input (not depicted) is received on an area on which a thumbnail image is displayed, the mobile terminal can provide a preview of a corresponding video in the area on which the thumbnail image is displayed. And, for example, the video information can include a date on which the video is captured, a size of the video, playback time of the video, a title of the video and the like. Meanwhile, the present invention can be applied not only to a video list including at least one video but also to various contents capable of being provided as a list. For example, the present invention can be applied to a music list including at least one or more music and a picture list including at least one picture. And, for example, the present invention can also be applied to a list including at least one or more pictures and at least one video.

Subsequently, the mobile terminal can receive a first input 520 inputted on the video list 510. For example, the first input 520 may correspond to an input inputted on a video among at least one video displayed on the video list 510. And, the first input may correspond to a drag touch input. For example, in FIG. 5 (a), the first input 520 may correspond to a drag touch input in right direction inputted on an A video. And, although it is not depicted in FIG. 5, the first input 520 may correspond to a drag touch input in left direction and may be able to include various touch inputs. In this case, the first input 520 may correspond to an input enabling a user to edit a video on a video list without executing a separate program for video editing.

Subsequently, the mobile terminal can display a timeline 530 corresponding to at least one video. In one embodiment, the mobile terminal can display a timeline for all of at least one video included in the video list 510 based on the first input 520 inputted on the video list 510. In particular, as shown in FIG. 5 (b), the mobile terminal can display all timelines for A video to E video. In another embodiment, the mobile terminal can display a timeline of a video only corresponding to a position on which the first input 520 is received based on the first input 520 inputted on the video list 510. In particular, although it is not depicted in FIG. 5, the mobile terminal can display a timeline of the A video only based on the first input 520 inputted on the video list 510.

Meanwhile, the timeline 530 can include at least one selected from the group consisting of editing section of at least one video, a start point indicator 531 of an editing section, and an end point indicator 532 of an editing section. In one embodiment, the mobile terminal can display the start point indicator 531 on the timeline 530 based on the first input 520. In this case, if an additional input is inputted on the timeline 530, the mobile terminal can display the end point indicator 532 on the timeline 530. As the start point indicator 531 and the end point indicator are determined, the mobile terminal can display an editing section. In another embodiment, the mobile terminal can display the end point indicator 532 on the timeline 530 based on the first input 520. In this case, if an additional input is received on the timeline 530, the mobile terminal can display the start point indicator 531 on the timeline 530.

And, in another embodiment, the mobile terminal can display both the start point indicator 531 and the end point indicator 532 on the timeline 530 at a time based on the first input 520. In this case, the timeline 530 indicates a total playback section of a corresponding video and an editing section indicates a playback section between a point at which the start point indicator 531 is located and a point at which the end point indicator 532 is located. In relation to the editing section, it shall be described in the following with reference to FIG. 6.

Figure 6:
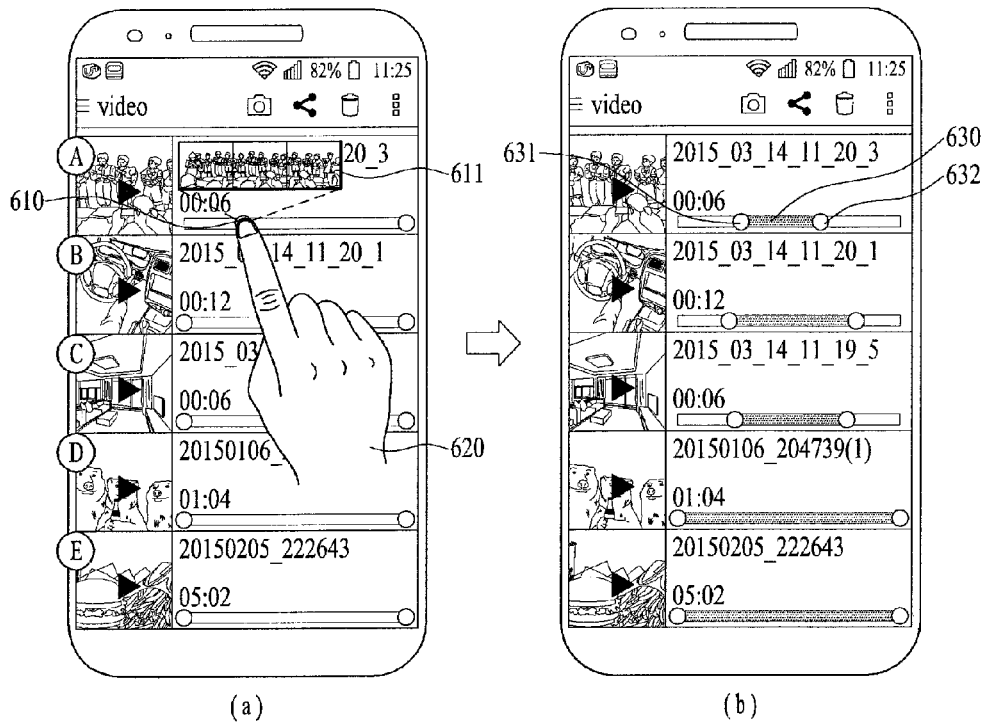
FIG. 6 shows diagrams for an embodiment of configuring an editing section in case of receiving an input on a video list of a mobile terminal according to the present invention.

FIG. 6 is a diagram for an embodiment of configuring an editing section 630 in case of receiving an input on a video list of a mobile terminal based on the present invention.

As mentioned earlier in FIG. 5, the mobile terminal can display a timeline for at least one video based on a first input inputted on a video list. In this case, a user can determine an editing section on a timeline of each video. In this case, the editing section may correspond to a part of a video required by a user instead of the whole of the video.

The mobile terminal can receive a second input 620 for moving at least one of a start point indicator and an end point indicator. In an embodiment of FIG. 6 (a), the mobile terminal can receive the second input 620 to move a start point indicator 610 of an A video. In this case, the second input may correspond to a drag touch input inputted on the start point indicator 610 on the timeline. Yet, the second input may be non-limited by the drag touch input. The second input may correspond to various input s.

In this case, the mobile terminal can display thumbnail images 611 of at least one frame adjacent to a point at which the second input 620 is sensed. More specifically, the mobile terminal can display a frame corresponding to the second input 620 and surrounding frames among a plurality of frames of a video as thumbnail images 611 on an area adjacent to the point at which the second input 620 is sensed on the timeline. In this case, the thumbnail images 611 displayed on the point at which the second input 620 is sensed can be displayed in a pop-up form.

For example, as shown in FIG. 6 (*a*), the thumbnail images 611 can be displayed at the top of the timeline. In doing so, a user can easily recognize scenes adjacent to a point on which an input is received in a video via the thumbnail images. Meanwhile, although it is not depicted in FIG. 6, if the second input corresponds to a drag input, the mobile terminal can display the thumbnail images 611 in a manner of changing the thumbnail images in accordance with a position change of the start point indicator 610.

Hence, as shown in FIG. 6 (*b*), the mobile terminal moves a position of the start point indicator 631 based on the second input 620 and may be then able to configure an editing section 630 of an A video. In succession to the second input 620, the mobile terminal moves a position of an end point indicator 632 in accordance with an additional input and may be then able to configure the editing section of the A video. As shown in FIG. 6 (*b*), the mobile terminal can respectively configure an editing section of at least one video included in a video list in a manner of repeating the aforementioned process.

Figure 7:
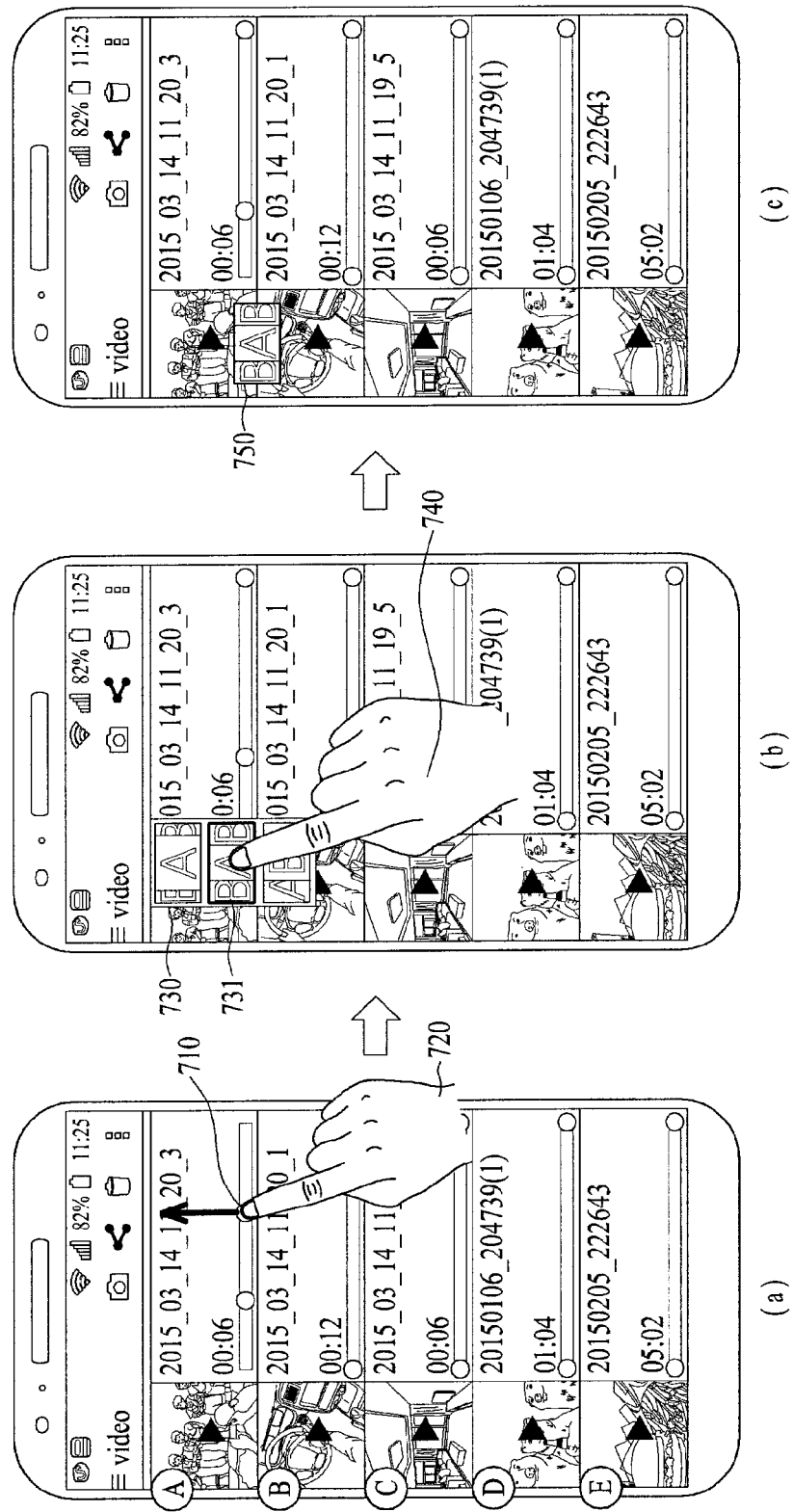
FIG. 7 shows diagrams for a first embodiment of displaying a transition menu option in case of receiving an input on a video list of a mobile terminal according to the present invention.
Figure 8:
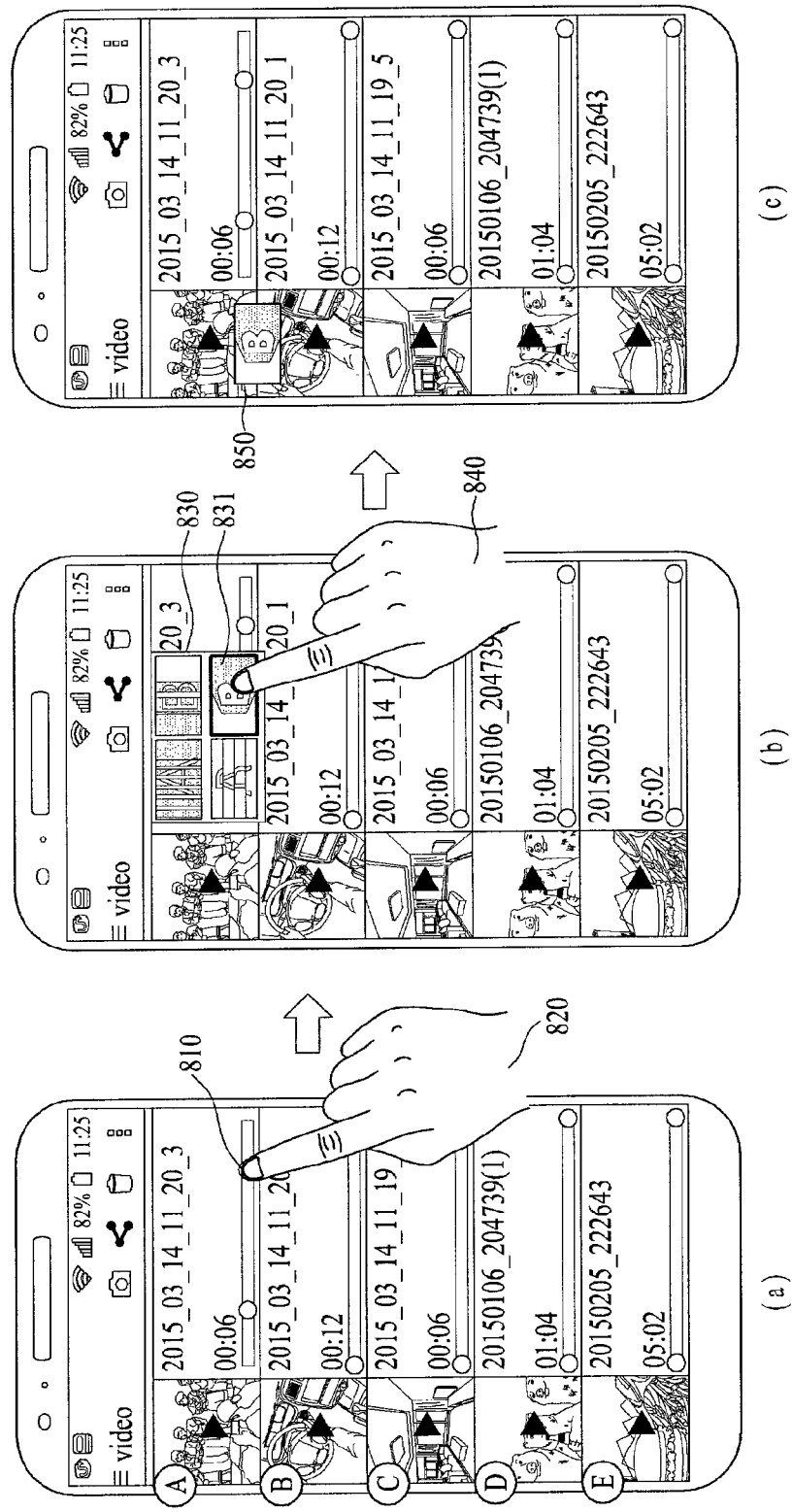
FIG. 8 shows diagrams for a second embodiment of displaying a transition menu option in case of receiving an input on a video list of a mobile terminal according to the present invention.

FIGS. 7 and 8 show a method of selecting a scene transition effect from a video editing of a mobile terminal and providing the selected scene transition effect to a user based on the present invention.

First of all, FIG. 7 is a diagram for a first embodiment of displaying a transition menu option in case of receiving an input on a video list of a mobile terminal according to the present invention.

In the present invention, editing a video list may correspond to continuously playing at least one displayed videos in a manner of configuring an editing section. Hence, A video to E video shown in FIG. 7 can be edited as a single video in a manner of combining each editing section with each other. In this case, when an editing section of each video is combined with each other, it may be necessary to have a transition menu option for smooth and natural scene transition. The transition menu option 730 can be used for the smooth and natural scene transition and can be provided to naturally connect videos with each other using a preferred effect when a user combines each of the video with each other.

The mobile terminal can receive a third input 720 inputted on at least one of a start point indicator and an end point indicator. For example, as shown in FIG. 7 (*a*), the mobile terminal can receive the third input 720 inputted on an end point indicator 710 of A video. In this case, the third input 720 may correspond to a drag touch input in up direction, by which the present invention may be non-limited. The third input 720 can include a drag touch input in down direction and various input methods as well.

Meanwhile, scene transition can be provided at a point where each video is combined with each other. An embodiment of FIG. 8 relates to scene transition in case that an editing section of A video and an editing section of B video are combined with each other. In this case, the scene transition can be provided at an end point of the A video and a start point of the B video. Hence, the third input 720 can be detected at the end point indicator of the A video or the start point indicator of the B video.

Subsequently, the mobile terminal can display the transition menu option 730 based on the third input 720. The transition menu option 730 can display a scene transition effect which is used for scene transition of a video corresponding to at least one of the start point indicator and the end point indicator on which the third input 720 is received. For example, the transition menu option 730 can be displayed in a pop-up form. Referring to FIG. 7 (*b*), the mobile terminal can display the transition menu option 730 including a default effect, a vertical effect and the like based on the third input 720. Besides the aforementioned effects, the transition menu option can include various effects. Referring to FIG. 7 (*b*), the transition menu option displays 3 effects at a time and remaining effects can be displayed by scrolling.

Subsequently, the mobile terminal can receive a fourth input 740 inputted on an effect 731 of the transition menu option 730. As shown in FIG. 7 (*b*), the mobile terminal can receive the fourth input 740 for selecting vertical in 731 from 3 transition effects displayed on the transition menu option 730. For example, the fourth input 740 may correspond to a short touch input.

In this case, the mobile terminal can display a transition effect indicator 750 on a position of a video into which a transition effect is inserted. As shown in FIG. 7 (*c*), the mobile terminal can display the transition effect indicator 750 between A video and B video based on a fourth touch input. And, the transition effect indicator 750 can be displayed on a part of the A video and a part of the B video in a manner of being overlaid. In doing so, a user can easily recognize a scene transition effect provided when the A video is switched to the B video.

FIG. 8 is a diagram for a second embodiment of displaying a transition menu option in case of receiving an input on a video list of a mobile terminal according to the present invention. In an embodiment of FIG. 8, explanation on a part identical to what is mentioned earlier in FIG. 7 is omitted.

As shown in FIG. 8 (*a*), the mobile terminal can receive a third input 820 inputted on an end point indicator 810 of A video. In this case, unlike the third input of FIG. 7, the third input 820 may correspond to a long touch input or a short touch input. Subsequently, the mobile terminal can display a transition menu option 830 based on the third input 820. Unlike the embodiment of FIG. 7, referring to an embodiment of FIG. 8 (*b*), the mobile terminal can display 4 effects on the transition menu option at a time for the use of scene transition. Besides the displayed 4 effects, the remaining effects can be provided by scrolling. For example, the effect used for the scene transition can include various effects including a blind effect, a slide effect, a zoom effect, a squeeze effect and the like. Meanwhile, although it is not depicted in FIG. 8, the third input may correspond to a multi touch input inputted on the end point indicator of the A video and the start point indicator of the B video.

Subsequently, as shown in FIG. 8 (*b*), the mobile terminal can receive a fourth input 840 inputted on an effect 831 of the transition menu option 830. In this case, the fourth input 840 may correspond to a short touch input. And, a scene transition effect selected by the fourth input 840 may correspond to a 'spin' effect. In this case, as shown in FIG. 8 (*c*), the mobile terminal can display a transition effect indicator 850 between the A video and the B video into which a transition effect is inserted.

Through the embodiments mentioned earlier in FIGS. 7 and 8, a user can easily configure a transition effect between editing section of each video on a video list without executing a separate editing program.

Figure 9:
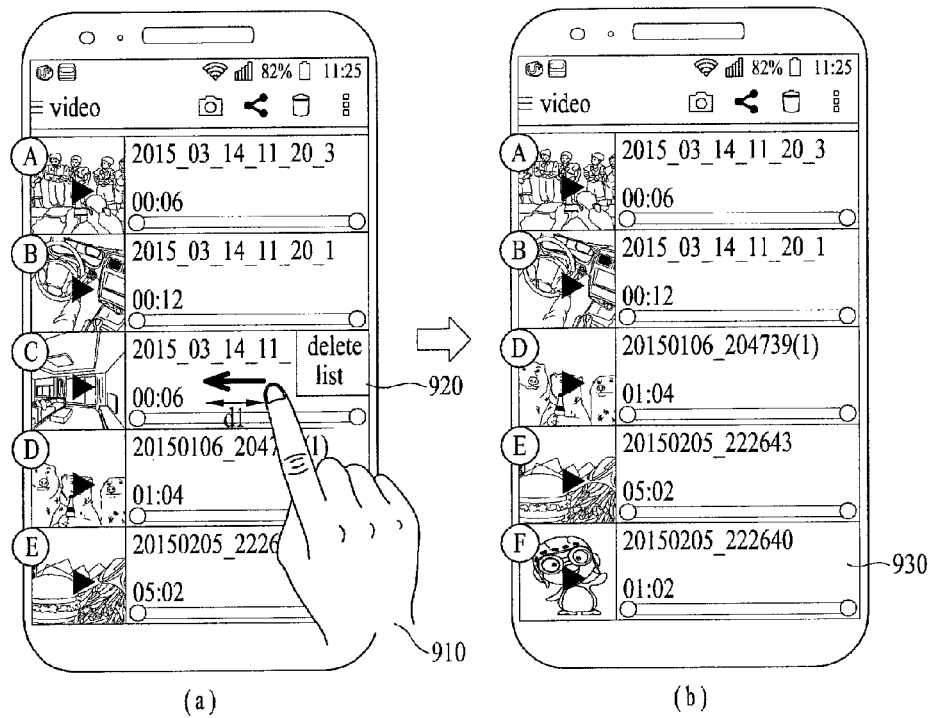
FIG. 9 shows diagrams for an embodiment of deleting at least one video from a video list of a mobile terminal according to the present invention.
Figure 10:
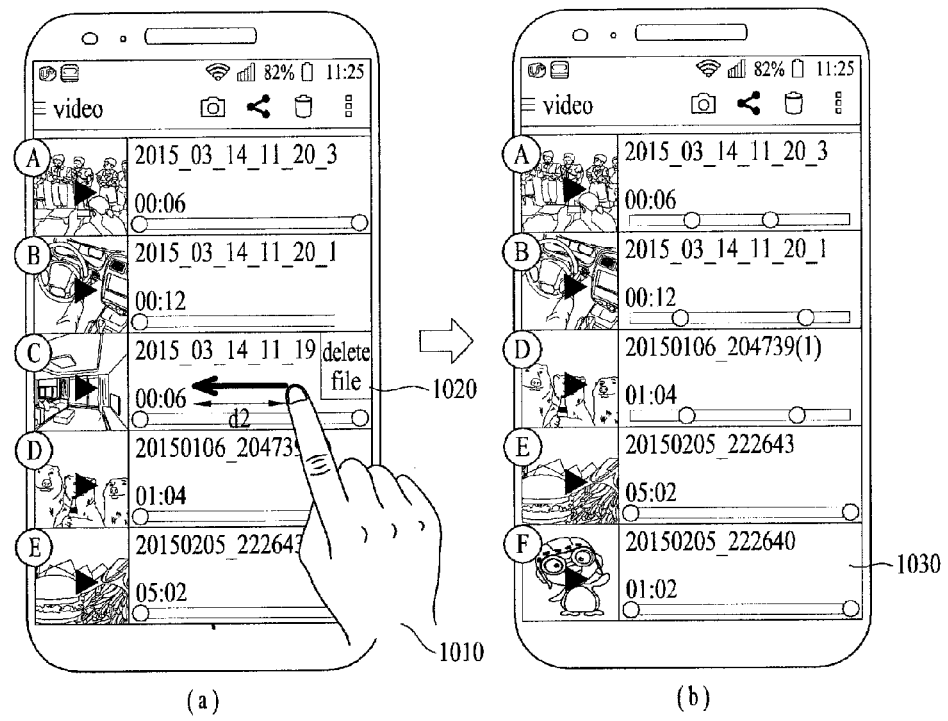
FIG. 10 shows diagrams for an embodiment of deleting at least one video from a memory of a mobile terminal according to the present invention.

In the following, FIGS. 9 and 10 show a method of deleting and moving each video on a video list. As mentioned in the foregoing description, at least one video displayed on a video list of the present invention may correspond to an editing section configured for continuous playback. Hence, a user can configure an edited video including all editing section of the at least one video included in the video list or an edited video including a part of the at least one video included in the video list.

First of all, FIG. 9 is a diagram for an embodiment of deleting at least one video from a video list of a mobile terminal according to the present invention.

The mobile terminal can receive a fifth input 910 inputted on a video among at least one video included in a video list. More specifically, as shown in FIG. 9 (*a*), the mobile terminal can receive the fifth input 910 inputted on C video. In this case, the fifth input 910 may correspond to a drag touch input in left direction, by which the present invention may be non-limited. The fifth may correspond to a drag touch input in right direction or a different input.

Meanwhile, the mobile terminal can determine whether the fifth input corresponds to an input belonging to a predetermined length range (d). In an embodiment of FIG. 9, the fifth input 910 is a drag input corresponding to a d1 length and may correspond to an input belonging to the predetermined length range (d). In this case, if the input belonging to the predetermined length range (d) is received, as shown in FIG. 9 (*a*), the mobile terminal displays a 'list delete' indicator 920 and may be able to display that a corresponding video is deleted from the video list. In particular, in FIG. 9 (*a*), if the 'list delete' indicator 920 is displayed based on the fifth input 910, the mobile terminal can indicate that the C video is deleted from the video list. Although it is not depicted in FIG. 9, if the fifth input 910 is an input not belonging to the predetermined length range (d), the mobile terminal may not display the 'list delete' indicator 920.

In this case, the mobile terminal can delete a video corresponding to a position on which the fifth input 910 is received from the video list. In particular, in the embodiment of FIG. 9 (*b*), the mobile terminal deletes the C video corresponding to the position on which the fifth input 910 is received from the list and may be then able to move videos positioned after the C video in up direction. Hence, after the C video is deleted from the list, the mobile terminal can provide a new F video 930 to the video list. And, in the embodiment of FIG. 9, the C video is deleted from the video list only and may be maintained in a memory as it is. In one embodiment, the C video deleted from the video list can be positioned at the very last of the video list in a manner of being moved.

FIG. 10 is a diagram for an embodiment of deleting at least one video from a memory of a mobile terminal according to the present invention.

The mobile terminal can receive a sixth input inputted on a video among at least one video included in a video list. More specifically, as shown in FIG. 10 (*a*), the mobile terminal can receive the sixth input 1010 inputted on C video. In this case, the sixth input 1010 may correspond to a drag touch input in left direction, by which the present invention may be non-limited. The sixth may correspond to a drag touch input in right direction or a different input.

Meanwhile, the mobile terminal can determine whether the sixth input corresponds to an input belonging to a predetermined length range (d). In an embodiment of FIG. 10, the sixth input 1010 is a drag touch input corresponding to a d2 length and may correspond to an input not belonging to the predetermined length range (d). In particular, if the input not belonging to the predetermined length range (d) is received, as shown in FIG. 10 (*a*), the mobile terminal displays a 'file delete' indicator 1020 and may be able to display that a corresponding video is deleted not only from the video list but also from a memory. In particular, in FIG. 10 (*a*), if the 'file delete' indicator 1020 is displayed based on the sixth input 1010, the mobile terminal can indicate that the C video is deleted from the memory. Although it is not depicted in FIG. 10, if the sixth input 1010 does not exceed the predetermined length range (d), as mentioned earlier in FIG. 9, the mobile terminal may delete the corresponding video from the list only.

In this case, the mobile terminal can delete a video corresponding to a position on which the sixth input 1010 is received from the memory on the video list. In particular, in the embodiment of FIG. 10 (*b*), the mobile terminal deletes the C video corresponding to the position on which the sixth input 1010 is received from the list and may be then able to move videos positioned after the C video in up direction. Hence, after the C video is deleted from the memory, the mobile terminal can provide a new F video 1030 to the video list.

According to the embodiments of FIGS. 9 and 10, although a user adds a drag touch input of a single type, the user is able to easily delete at least one video from the video list or from both the list and the memory.

Meanwhile, although it is not depicted in FIGS. 9 and 10, if the mobile terminal receives an input inputted on a video among at least one video included in the video list, the mobile terminal can edit a playback order. For example, the mobile terminal adds a long touch and a drag input to a video included in the video list and may be then able to change a position of the video in the video list.

Figure 11:
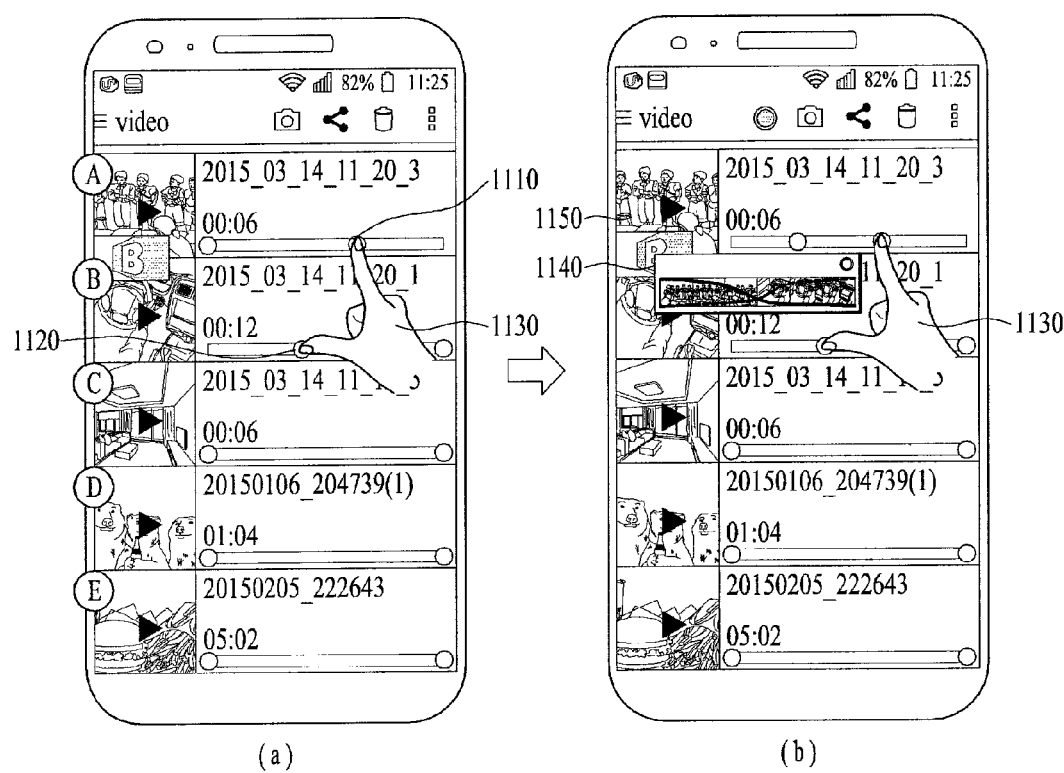
FIG. 11 shows diagrams for an embodiment of displaying a playback option according to an input inputted on a video list of a mobile terminal according to the present invention.

In the following, FIGS. 11 to 14 shows a method of configuring a playback option of at least one editing section using a multi touch input on a video list. In this case, the playback option can indicate a change of playback speed and transition speed of each editing section First of all, FIG. 11 is a diagram for an embodiment of displaying a playback option according to an input inputted on a video list of a mobile terminal according to the present invention.

The mobile terminal can receive a seventh input inputted on a first video and a second video. More specifically, as shown in FIG. 11 (*a*), the mobile terminal can receive a seventh input 1130 inputted on an end point indicator 1110 of A video and a start point indicator 1120 of B video. In this case, the seventh input 1130 corresponds to a for designating a range of an edited video. The may correspond to an input inputted on a video corresponding to a first section of the edited video and the input inputted on a video corresponding to a last section of the edited video. For example, the seventh input 1130 may correspond to a multi touch input, by which the present invention may be non-limited. The seventh input can include various input methods. And, the seventh input 1130 may correspond to an input inputted on a random point of the A video and the input inputted on a random point of the B video.

In this case, the mobile terminal can display a playback option of which an editing section of a first video and an editing section of a second video are combined with each other based on the seventh input 1120. In this case, the second video corresponds to a video positioned after the first video. The second video may correspond to a video positioned immediately after the first video or a video positioned thereafter. More specifically, while the seventh input 1120 is received, the mobile terminal can display a playback option 1140 on the video list. In an embodiment of FIG. 11 (*b*), the mobile terminal can display the playback option 1140 of which the editing section of the A video and the editing section of the B video are combined with each other between the A video and the B video.

Meanwhile, although it is not depicted in FIG. 11, if the mobile terminal receive the seventh input inputted on the A video and the C video, the mobile terminal can display a playback option of which the editing section of the A video, the editing section of the B video and the editing section of the C video are combined with each other on the video list.

Figure 12:
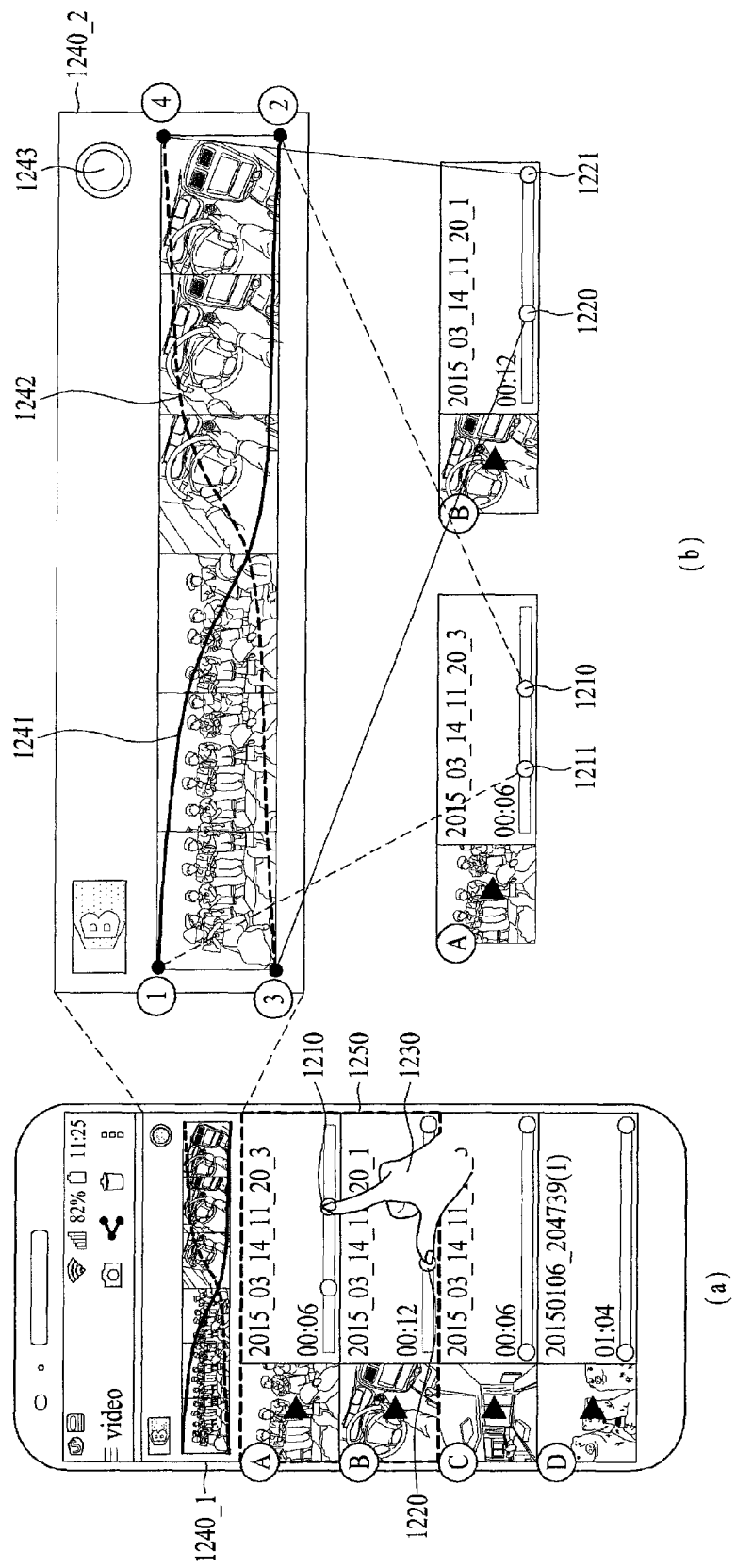
FIG. 12 shows diagrams for a playback option displayed on a video list of a mobile terminal according to the present invention.

FIG. 12 is a detailed diagram for a playback option displayed on a video list of a mobile terminal according to the present invention.

As mentioned earlier in FIG. 11, the mobile terminal can display a playback option of which an editing section of a first video and an editing section of a second video are combined with each other based on a seventh input inputted on the first video and the second video. As shown in FIG. 12 (*a*), the mobile terminal can display a playback option 1240_1 based on a multi touch input inputted on an end point indicator 1210 of A video and a start point indicator 1220 of B video. Unlike the embodiment of FIG. 11, according to an embodiment of FIG. 12, the mobile terminal can display the playback option 1240_1 on the top of the video list. In this case, it may be able to display an indicator 1250 to indicate videos included in the playback option 1240_1.

A playback option 1240_2 of FIG. 12 (*b*) corresponds to a drawing magnifying the playback option 1240_1 shown in FIG. 12 (*a*). In the following, each area of the playback option 1240_2 is explained. A first graph 1241 is a graph corresponding to scene transition of the A video and a second graph 1242 is a graph corresponding to scene transition of the B video. And, a first point of the first graph 1241 corresponds to a point at which a start point indicator 1211 is located among an editing section of the A video and a second point of the first graph 1241 corresponds to a point at which an end point indicator 1210 is located among the editing section of the A video. For example, if the mobile terminal receives a drag touch input in up/down direction inputted on the start point indicator 1211 among the editing section of the A video, a form of the graph for scene transition of the first point of the first graph may change. And, for example, if the mobile terminal receives a drag touch input in up/down direction inputted on the end point indicator 1210 among the editing section of the A video, a form of the graph for scene transition of the second point of the first graph may change.

And, a third point of the second graph 1242 corresponds to a point at which a start point indicator 1220 is located among an editing section of the B video and a fourth point of the second graph 1242 corresponds to a point at which an end point indicator 1221 is located among the editing section of the B video. For example, if the mobile terminal receives a drag touch input in up/down direction inputted on the start point indicator 1220 among the editing section of the B video, a form of the third point of the second graph 1242 may change. And, for example, if the mobile terminal receives a drag touch input in up/down direction inputted on the end point indicator 1221 among the editing section of the B video, a form of the fourth point of the second graph 1242 may change.

And, the playback option 1240_2 includes a store icon 1243. If the store icon is selected, the video of which the editing section of the A video and the editing section of the B video are combined with each other is encoded and the encoded video can be stored in a memory.

Figure 13:
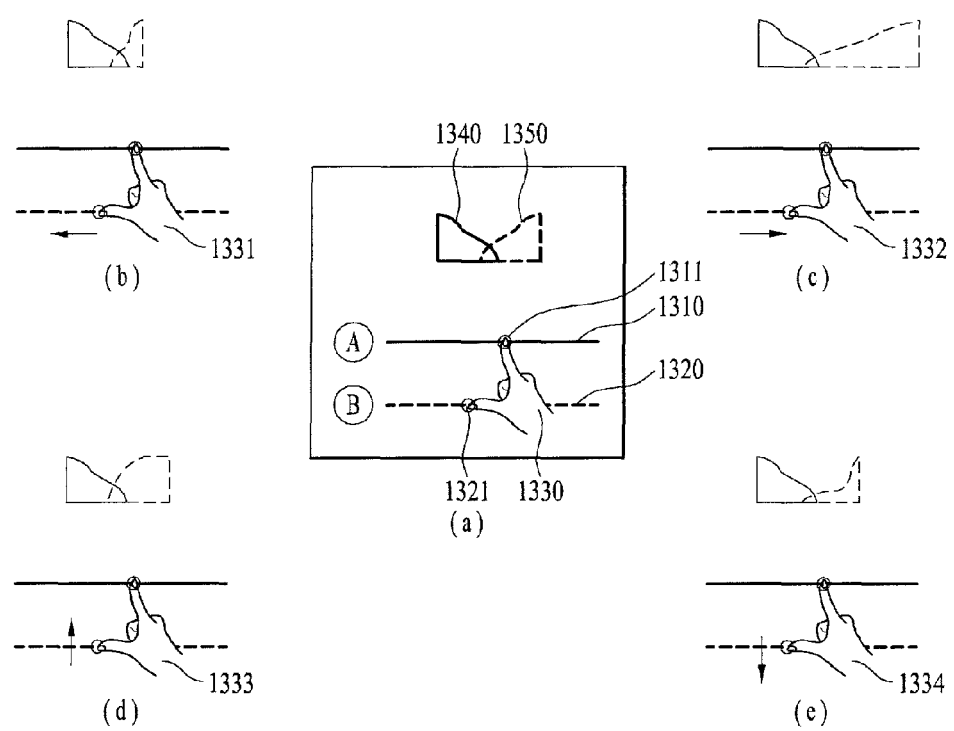
FIG. 13 shows diagrams for an embodiment of controlling a playback option shown in FIG. 12.

FIG. 13 is a diagram for an embodiment of controlling a playback option shown in FIG. 12.

First of all, as shown in FIG. 13 (*a*), the mobile terminal can display a playback option based on a seventh input 1330 inputted on a first point 1311 of a timeline 1310 of A video and a second point 1321 of a timeline 1320 of B video. The playback option can display a first graph 1340 corresponding to the A video and a second graph 1350 corresponding to the B video. A graph shown in FIG. 13 (*a*) may correspond to a default graph which is displayed when the mobile terminal receives the seventh input 1330.

Having received the seventh input 1330, the mobile terminal can additionally receive an eighth input. In this case, the eighth input may correspond to a drag touch input contiguous with the seventh input 1330.

In one embodiment, the mobile terminal can control playback time of an editing section based on the eighth input 1331/1332 contiguous with the seventh input 1330 and corresponding to a drag touch input in left/right direction. For example, as shown in FIG. 13 (*b*), the mobile terminal can receive an eighth input 1331 moving a left thumb, which has touched the B video, to the left. In this case, the mobile terminal can change a width of a second graph 1350 to be narrower based on the eighth input 1331. In particular, the mobile terminal can change playback time to be shorter in a manner of making playback speed of an editing section of the B video to be faster. Meanwhile, although it is not depicted in FIG. 13, if an eighth input moving an index finger to the left is received, the mobile terminal makes playback speed of an editing section of the A video to be faster and may be able to change playback time to be shorter.

And, for example, as shown in FIG. 13 (*c*), the mobile terminal can receive an eighth input 1332 moving a thumb, which has touched the B video, to the right. In this case, the mobile terminal can change a width of a second graph 1350 to be wider based on the eighth input 1332. In particular, the mobile terminal can change playback time to be longer in a manner of making playback speed of an editing section of the B video to be slower. Meanwhile, although it is not depicted in FIG. 13, if an eighth input moving an index finger to the right is received, the mobile terminal makes playback speed of an editing section of the A video to be slower and may be able to change playback time to be longer.

In another embodiment, the mobile terminal can control transition speed of an editing section based on an eighth input 1331/1332 contiguous with the seventh input 1330 and corresponding to a drag touch input in up/down direction. For example, as shown in FIG. 13 (*d*), the mobile terminal can receive an eighth input 1333 moving a thumb, which has touched the B video, in up direction. In this case, the mobile terminal can change a slope of a second graph 1350 to be steeper in response to the eighth input 1333. In particular, the mobile terminal can change transition speed making the B video to be appeared to be faster. Meanwhile, although it is not depicted in FIG. 13, if an eighth input for moving an index finger in up direction is received, the mobile terminal can change transition speed making the A video to be disappeared to be faster.

And, as shown in FIG. 13 (*e*), the mobile terminal can receive an eighth input 1334 moving a thumb, which has touched the B video, in down direction. In this case, the mobile terminal can change a slope of a second graph 1350 to be gentler in response to the eighth input 1334. In particular, the mobile terminal can change transition speed making the B video to be appeared to be slower. Meanwhile, although it is not depicted in FIG. 13, if an eight input moving an index finger in down direction is received, the mobile terminal can change transition speed making the A video to be disappeared to be slower.

Meanwhile, the playback option which is changed based on a direction of the eighth input 1334 may be non-limited by the aforementioned embodiments. The playback option may change in an opposite way. In particular, for example, if the eighth input corresponds to a drag input moving in left/right direction, the mobile terminal can change transition speed of a video to be faster or slower. And, for example, if the eighth input corresponds to a drag input moving in up/down direction, the mobile terminal can change playback time and playback speed of a video.

Figure 14:
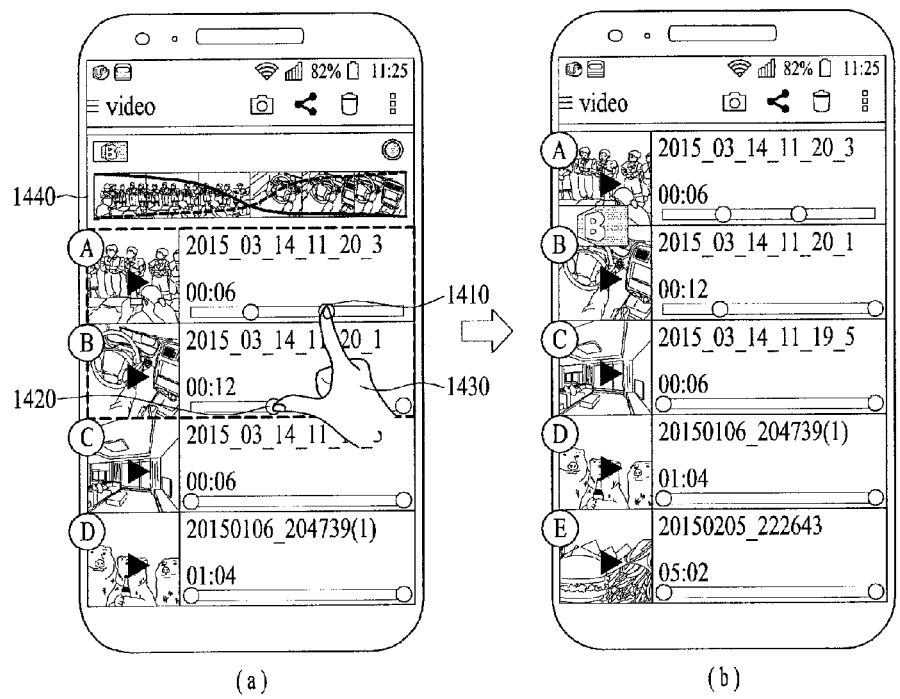
FIG. 14 shows diagrams for an embodiment of eliminating a displayed playback option according to an input from a video list of a mobile terminal according to the present invention.

FIG. 14 is a diagram for an embodiment of eliminating a displayed playback option according to an input from a video list of a mobile terminal according to the present invention.

As shown in FIG. 14 (*a*), the mobile terminal can display a playback option 1440 based on a seventh input 1430. In this case, the seventh input 1430 may correspond to a multi touch input inputted on an end point indicator 1410 of A video and a start point indicator 1420 of B video.

Subsequently, the mobile terminal can receive termination of the seventh input 1430. More specifically, the mobile terminal can receive a touch off of the multi touch input inputted on the end point indicator 1410 of the A video and the start point indicator 1420 of the B video. In this case, the mobile terminal can delete the playback option 1440 displayed on the video list. In particular, as shown in FIG. 14 (*b*), if the seventh input 1430 is terminated, the mobile terminal can display the video list on which each editing section of at least one video is displayed.

According to the embodiments mentioned earlier in FIG. 11 to FIG. 14, if a user adds a multi touch input and performs a drag input at the same time, the user can easily change a playback option of a video.

In the following, FIGS. 15 to 25 shows a method of displaying and configuring an editing option for scene transition of at least one video via various touch inputs on a video list. In this case, as mentioned earlier in FIG. 7 and FIG. 8, the scene transition can include various effects naturally displaying an editing section of at least one video combined with each other.

Figure 15:
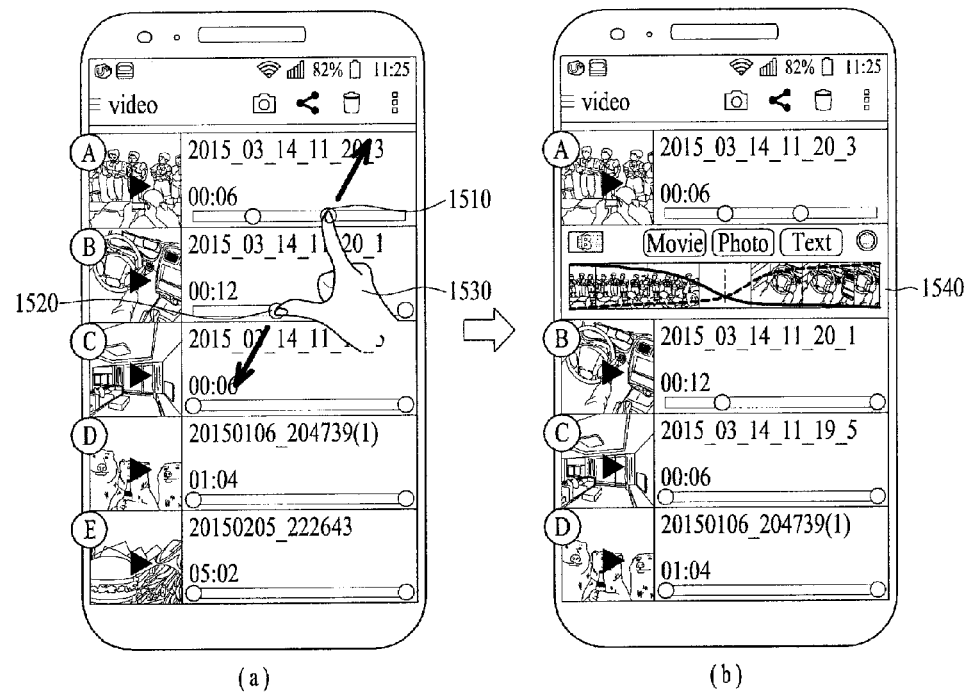
FIG. 15 shows diagrams for a first embodiment of displaying an editing option for scene transition according to an input on a video list of a mobile terminal according to the present invention.

First of all, FIG. 15 is a diagram for a first embodiment of displaying an editing option for scene transition according to an input on a video list of a mobile terminal according to the present invention.

The mobile terminal can receive a ninth input 1530 inputted on a third video and a fourth video. In this case, the ninth input 1530 may correspond to a pinch-in input, by which the present invention may be non-limited. The ninth input can include various multi touch inputs. And, a position on which the ninth input 1530 is received may correspond to a point of the third video and a point of the fourth video. For example, in FIG. 15 (*a*), the ninth input 1530 may correspond to a pinch-in input inputted on an end point indicator 1510 of A video and a start point indicator 1520 of B video. And, the fourth video may correspond to a video positioned after the third video.

Subsequently, the mobile terminal can display an editing option 1540 for scene transition of the third video to the fourth video based on the ninth input 1530. Unlike the embodiment of FIG. 11 displaying a playback option of each editing section, according to FIG. 15, the editing option 1540 for scene transition between editing section can be displayed in spite that the ninth input 1530 is not maintained. In this case, the editing option 1540 for scene transition can be displayed between at least one video becoming a target of the scene transition. For example, as shown in FIG. 15 (*b*), the mobile terminal can display the editing option 1540 for the scene transition between the A video and the B video that become a target of combining editing section with each other. Various items included in the editing option 1540 for the scene transition are explained later with reference to FIG. 18.

Figure 16:
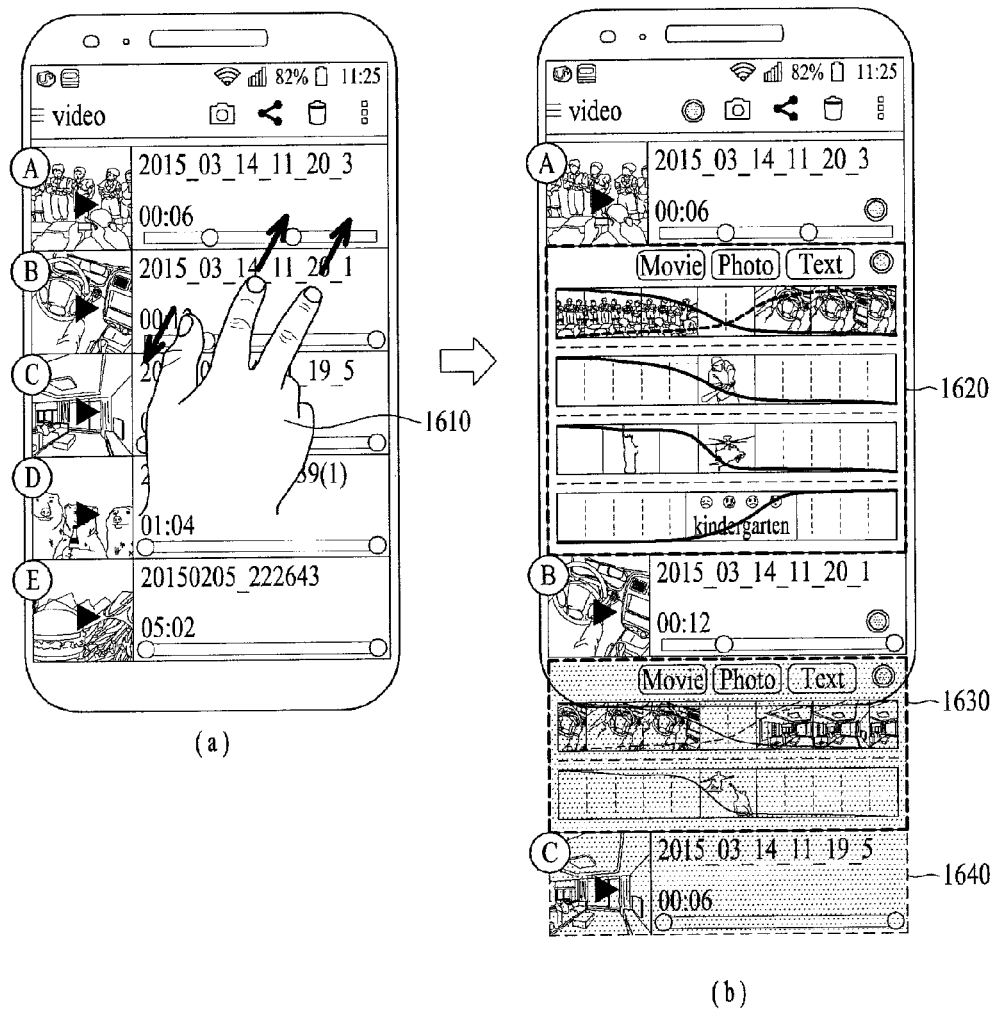
FIG. 16 shows diagrams for a second embodiment of displaying an editing option for scene transition according to an input on a video list of a mobile terminal according to the present invention.

FIG. 16 is a diagram for a second embodiment of displaying an editing option for scene transition according to an input on a video list of a mobile terminal according to the present invention.

The mobile terminal can receive a tenth input 1610 inputted on a video list. In this case, the tenth input 1610 may correspond to a pinch-in input. Yet, unlike the ninth input mentioned earlier in FIG. 15, the tenth input 1610 shown in FIG. 16 (*a*) may correspond to a pinch-in input inputted on three points. And, positions on which the tenth input 1610 is received may correspond to unspecified three points on the video list.

Subsequently, the mobile terminal can display all editing options for scene transition of at least one video based on the tenth input 1610. For example, as shown in FIG. 16 (*b*), the mobile terminal can display an editing option 1620 for scene transition between A video and B video, an editing option 1630 for scene transition between B video and C video and the like. In this case, since it is difficult to display all editing options due to a space deficiency of a touch screen of the mobile terminal, an area 1640 can be displayed by scrolling of a user. Various items included in the editing option 1620/1630 for scene transition are explained in the following with reference to FIG. 17.

Figure 17:
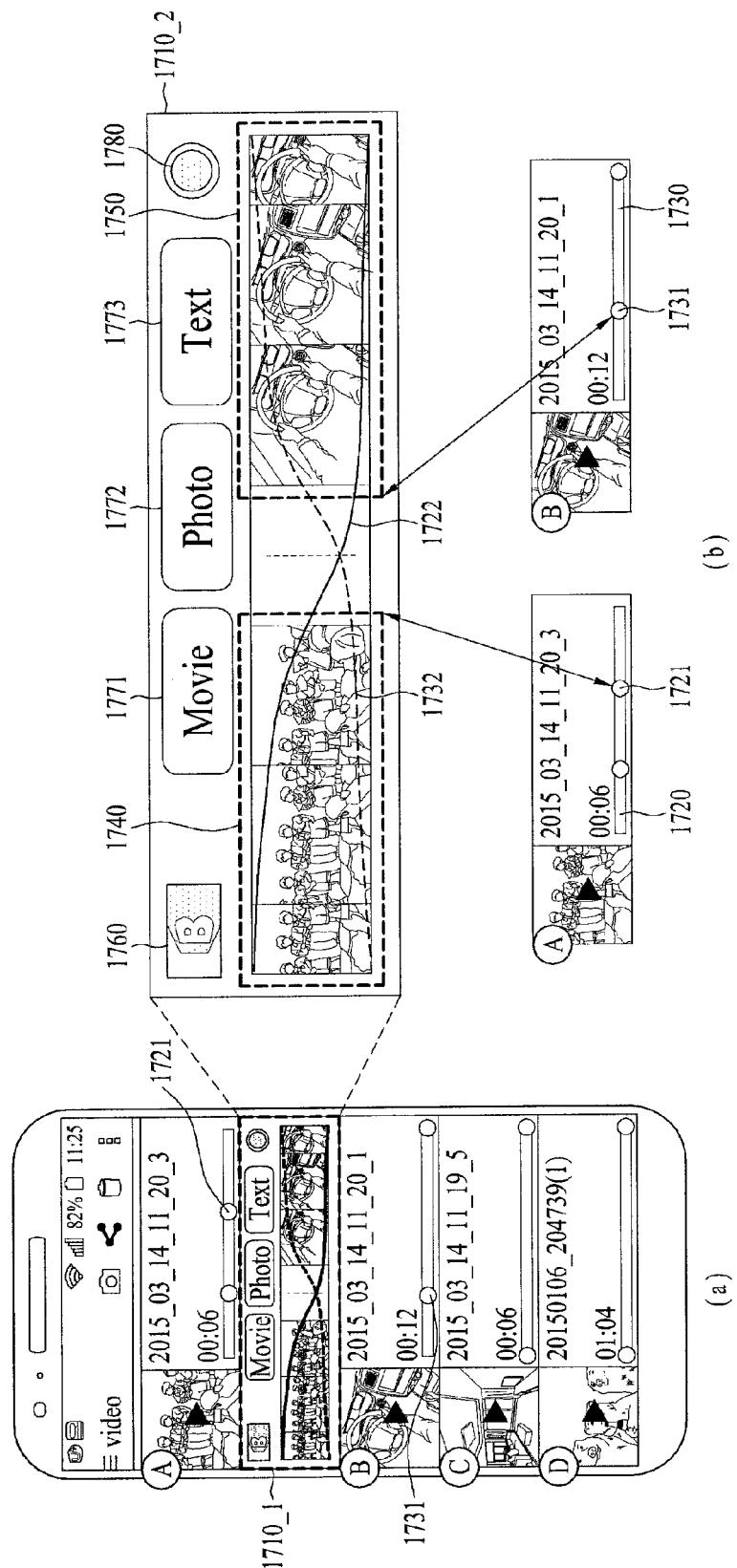
FIG. 17 shows detailed diagrams for an editing option for scene transition displayed on a video list of a mobile terminal according to the present invention.

FIG. 17 is a detailed diagram for an editing option for scene transition displayed on a video list of a mobile terminal according to the present invention.

As mentioned earlier in FIG. 15, the mobile terminal can display an editing option 1710_1 for scene transition of third video and fourth video based on a ninth input inputted on the third video and the fourth video. As shown in FIG. 17 (*a*), the mobile terminal can display the editing option 1710_1 between the A video and the B video.

An editing option 1710_2 of FIG. 17 (*b*) corresponds to a drawing magnifying the editing option 1710_1 shown in FIG. 17 (*a*). Each area is explained in the following. A third graph 1722 corresponds to a graph corresponding to an editing section of the A video. For example, the third graph 1722 may correspond to a graph corresponding to an end part of the editing section of the A video. A fourth graph 1732 corresponds to a graph corresponding to an editing section of the B video. For example, the fourth graph 1732 may correspond to a graph corresponding to a start part of the editing section of the B video. The third graph and the fourth graph can indicate how a video is transited when scene transition is performed.

And, a plurality of thumbnails 1740 corresponding to the third graph 1722 may correspond to a part of a plurality of thumbnails included in the editing section of the A video. For example, a plurality of the thumbnails 1740 may correspond to 3 contiguous thumbnail images corresponding to the end part of the editing section of the A video. For example, a plurality of the thumbnail images 1740 may correspond to a plurality of frames capable of being displayed on the basis of a last frame of the A video.

And, a plurality of thumbnails 1750 corresponding to the fourth graph 1732 may correspond to a part of a plurality of thumbnails included in the editing section of the B video. For example, a plurality of the thumbnails 1750 may correspond to 3 contiguous thumbnail images corresponding to the start part of the editing section of the B video. For example, a plurality of the thumbnail images 1750 may correspond to a plurality of frames capable of being displayed on the basis of a first frame of the B video.

The mobile terminal displays the aforementioned plurality of the thumbnail images 1740/1750 and enables a user to anticipate an effect appearing when a scene is switched from the editing section of the A video to the editing section of the B video. And, 2 empty frames between parts on which a plurality of the thumbnail images are displayed correspond to a space for scene transition editing. An additional video, an additional image, an additional text and the like can be inserted into the space.

Meanwhile, a last part of a plurality of the thumbnail images 1740 may correspond to an area at which the end point indicator 1721 is located in the editing section of the A video. And, a first part of a plurality of the thumbnail images 1750 may correspond to an area at which the start point indicator 1731 is located in the editing section of the B video.

And, the mobile terminal can display a transition menu option 1740 on the editing option 1710_2 for scene transition. Through the transition menu option, a user can anticipate a transition effect to be displayed when the editing section of the A video is switched to the editing section of the B video. Although it is not depicted in FIG. 17, if an input is received on the transition menu option 1740, the mobile terminal can change an option for scene transition.

The mobile terminal can include various options capable of being added to the editing option 1710_2 for scene transition. For example, the mobile terminal can include an option 1771 for adding a video. In relation to this, it shall be explained in detail with reference to FIG. 19. And, for example, the mobile terminal can include an option 1772 for adding an image. In relation to this, it shall be explained in detail with reference to FIG. 21. And, for example, the mobile terminal can include an option 1773 for adding a text. In relation to this, it shall be explained in detail with reference to FIG. 21.

Meanwhile, the mobile terminal can include a store icon 1780 for storing a video of which editing is completed on the editing option 1710_2 for scene transition. For example, if an input is received on the store icon 1780, the mobile terminal can encode and store a video of which the editing section of the A video and the editing section of the B video are combined with each other in consideration of an edited scene transition effect.

Figure 18:
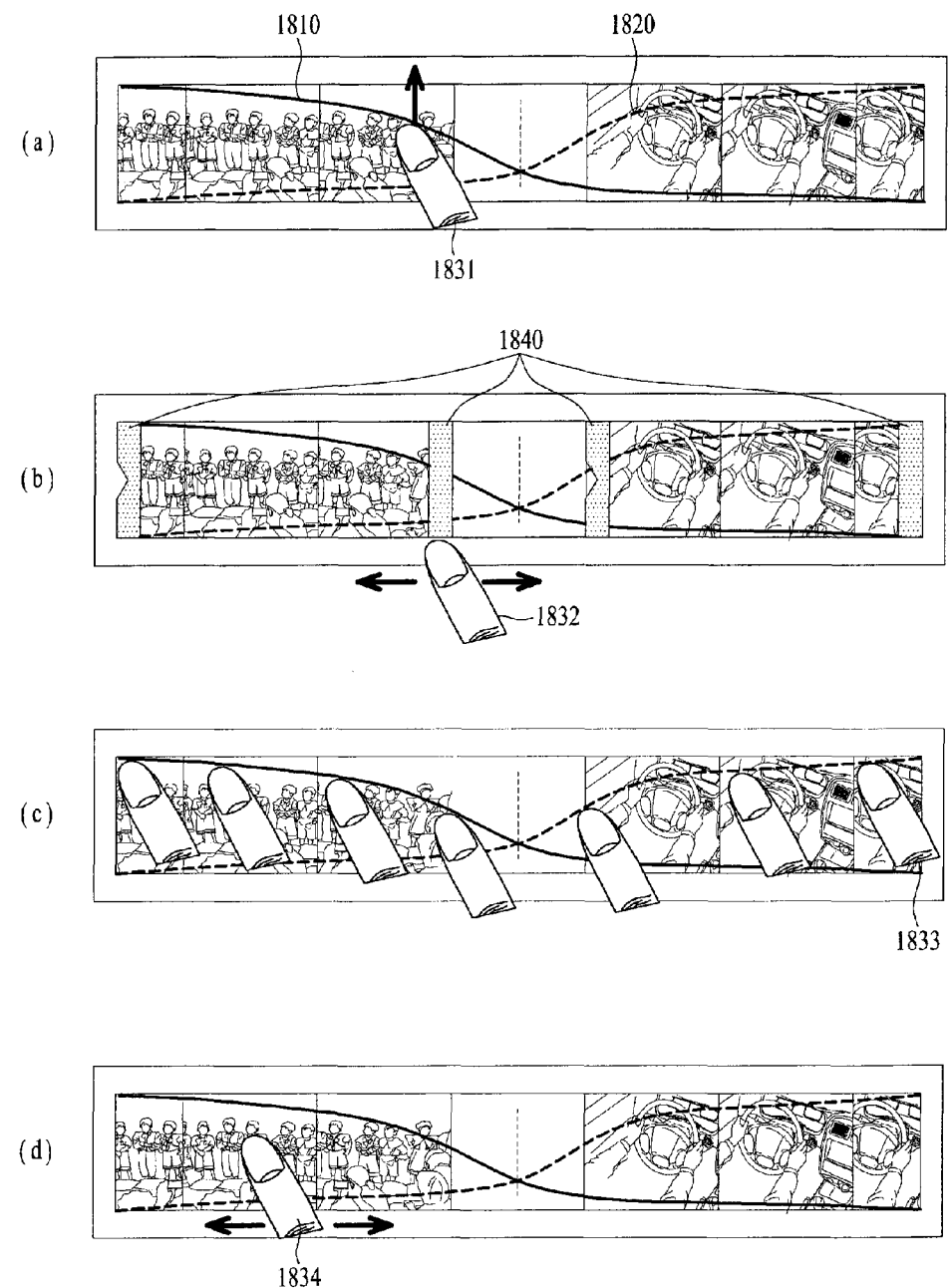
FIG. 18 shows diagrams for an embodiment of controlling an editing option for scene transition displayed on a video list of a mobile terminal according to the present invention.

FIG. 18 is a diagram for an embodiment of controlling an editing option for scene transition displayed on a video list of a mobile terminal according to the present invention.

More specifically, FIG. 18 is a diagram for an embodiment of controlling a graph and a thumbnail among an editing option for scene transition based on various inputs inputted on the editing option. In FIG. 18, assume that an editing line 1810 corresponds to the third graph shown in FIG. 17 and an editing line 1820 corresponds to the fourth graph shown in FIG. 17. In particular, the editing line 1810 corresponds to a graph corresponding to the editing section of the A video of FIG. 17 and the editing line 1820 corresponds to a graph corresponding to the editing section of the B video of FIG. 17.

In FIG. 18 (*a*), the mobile terminal can receive an eleventh input 1831 inputted on the editing line 1810. In this case, the eleventh input 1831 may correspond to a drag touch input moving the editing line 1810 for scene transition to up/down direction. In this case, an inflection point is generated on the editing line 1810 corresponding to a position on which the eleventh input 1831 is received and a scene transition effect may change.

In FIG. 18 (*b*), the mobile terminal can receive an eleventh input 1832 inputted on at least one start point or end points of the A video and the B video. In this case, the eleventh input 1832 may correspond to a drag touch input moving a last frame of the A video in the left/right direction. In this case, a length of a frame corresponding to a position on which the eleventh input 1832 is received is extended or reduced. Hence, scene transition time may change.

In FIG. 18 (*c*), the mobile terminal can receive an eleventh input 1833 inputted on an editing line 1810/1820. In this case, the eleventh input 1833 may correspond to a short touch input inputted on the editing line 1820. In this case, a pointer is generated on a position on which the eleventh input 1833 is received on the editing line 1810/1820 and the pointer is designated as a reference of an inflation point. Hence, a scene transition effect may change.

In FIG. 18 (*d*), the mobile terminal can receive an eleventh input 1834 inputted on a frame which is displayed for scene transition. In this case, the eleventh input 1834 may correspond to a drag input dragging a frame among a plurality of frames in left/right direction. In this case, the mobile terminal can change a frame in a manner of moving a displayed frame in the left/right direction.

In the following, FIGS. 19 to 22 correspond to an embodiment for explaining an additional editing option for scene transition. In FIG. 19 to FIG. 22, when a scene of an editing section of each video is switched, a method for a mobile terminal to insert an additional track, a video, an image, a text and the like based on a twelfth input to a fourteenth input is explained.

Figure 19:
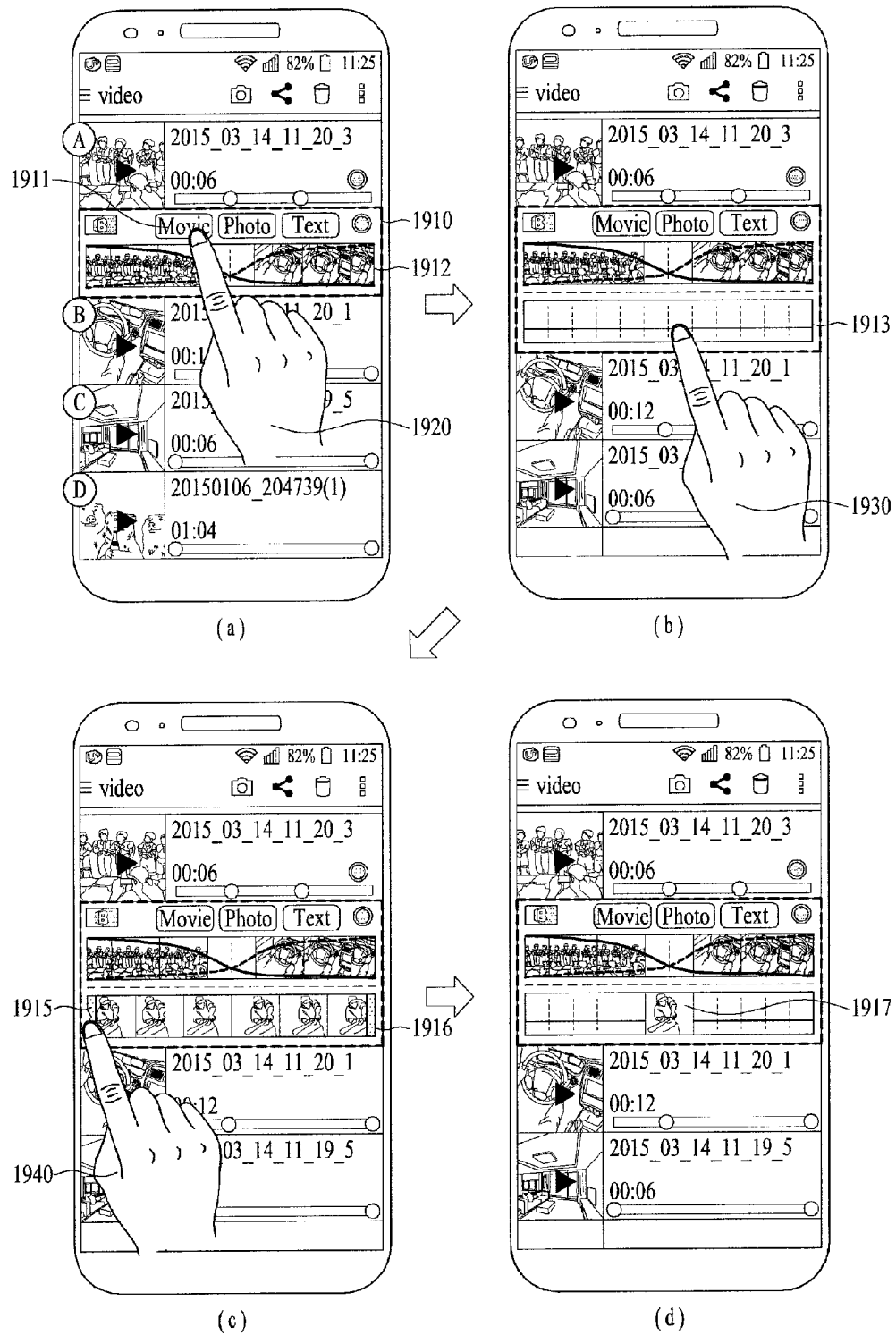
FIG. 19 shows diagrams for a first embodiment of providing an additional editing option for scene transition in the middle of editing at least one video of a mobile terminal according to the present invention.

FIG. 19 is a diagram for a first embodiment of providing an additional editing option for scene transition in the middle of editing at least one video of a mobile terminal according to the present invention.

More specifically, FIG. 19 is a diagram for an embodiment of adding a video when scene transition of at least one video of the mobile terminal is edited. In particular, FIG. 19 shows an embodiment of adding a video to be inserted when a scene is switched from an editing section of A video to an editing section of B video.

As shown in FIG. 19 (*a*), the mobile terminal can receive a twelfth input 1920 inputted on a video add icon 1911. More specifically, the mobile terminal can receive the twelfth input 1920 inputted on the video add icon 1911 while a default track 1912 is displayed on an editing option for scene transition. In this case, the default track 1912 indicates a track on which thumbnail images and an editing line of an end part of an editing section of the A video and thumbnail images and an editing line of a start part of an editing section of the B video are displayed. For example, the twelfth input 1920 may correspond to a short touch input, by which the present invention may be non-limited. The twelfth input can include various inputs.

In this case, as shown in FIG. 19 (b), the mobile terminal can display an additional video track 1913 based on the twelfth input 1920. For example, the additional video track 1913 can be displayed at the bottom of the default track 1912. And, since the additional video track 1913 currently displays a track and a default editing line only, it is unable to know which video is added and how a video is added.

Subsequently, as shown in FIG. 19 (b), the mobile terminal can receive a thirteenth input 1930 inputted on the additional video track 1913. In this case, the thirteenth input 1930 may correspond to an input for adding a specific video to the additional video track 1913. For example, the thirteenth input may correspond to a long touch input.

In this case, the mobile terminal can provide a window (not depicted) capable of searching for a video to be added to the additional video track based on the thirteenth input 1930. Hence, as shown in FIG. 19 (c), an additional video 1916 can be displayed on the additional video track 1913. In this case, the mobile terminal can display an indicator 1915 for controlling a length of the additional video 1916.

The mobile terminal can receive a fourteenth input 1940 inputted on the indicator 1915. In this case, the fourteenth input 1940 may correspond to a signal for controlling the length of the additional video 1916 in a manner of moving the indicator 1915. The mobile terminal can control the length of the additional video 1916 based on the received fourteenth input 1940. More specifically, as shown in FIG. 19 (d), the mobile terminal can control the length of the additional video 1916 to be adjusted to a size 1917 capable of being inserted into an empty frame positioned between thumbnail images displayed on the default track 1912. And, although it is not depicted in FIG. 19, the mobile terminal can provide various transition effects to a user via a drag touch input in up/down direction inputted on an editing line which is displayed on the additional video track 1916. Through the embodiment of FIG. 19, the mobile terminal can provide an additional video to a user when the editing section of the A video and the editing section of the B video are switched from each other.

Figure 20:
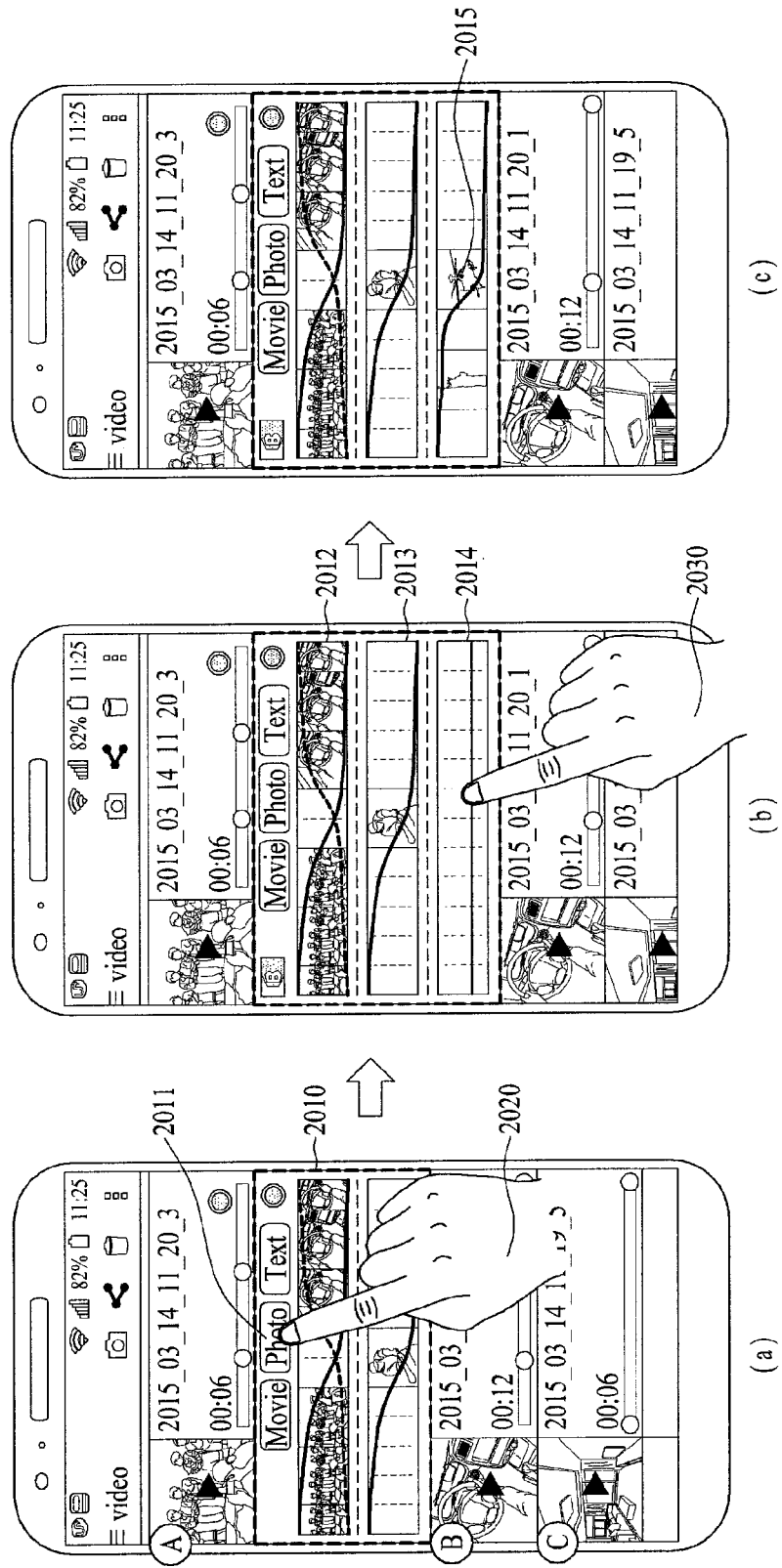
FIG. 20 shows diagrams for a second embodiment of providing an additional editing option for scene transition in the middle of editing at least one video of a mobile terminal according to the present invention.

FIG. 20 is a diagram for a second embodiment of providing an additional editing option for scene transition in the middle of editing at least one video of a mobile terminal according to the present invention.

More specifically, FIG. 20 is a diagram for an embodiment of adding an image when scene transition of at least one video of the mobile terminal is edited. In particular, FIG. 20 shows an embodiment of adding an image to be inserted when a scene is switched from an editing section of A video to an editing section of B video. In FIG. 20, contents overlapped with the contents mentioned earlier in FIG. 19 are omitted.

As shown in FIG. 20 (a), the mobile terminal can receive a twelfth input 2020 inputted on an image add icon 2011. More specifically, the mobile terminal can receive the twelfth input 2020 inputted on the image add icon 2011 while a default track 2012 and an additional video track 2013 are displayed on an editing option 2010 for scene transition. In this case, although it is not depicted in FIG. 20, the mobile terminal may be able to receive the twelfth input 2020 inputted on the image add icon 2011 while the default track 2012 is displayed on the editing option 2010 for scene transition only. For example, the twelfth input 2020 may correspond to a short touch input.

In this case, as shown in FIG. 20 (b), the mobile terminal can display an additional image track 2014 based on the twelfth input 2020. For example, as shown in FIG. 20 (b), the additional image track 2014 can be displayed at the bottom of the default track 2012 and the additional video track 2013. And, since the additional image track 2014 currently displays a track and an editing line only, it is unable to know which image is added.

Subsequently, as shown in FIG. 20 (b), the mobile terminal can receive a thirteenth input 2030 inputted on the additional image track 2014. In this case, the thirteenth input 2030 may correspond to an input for adding a specific image to the additional image track 2014. For example, the thirteenth input 2030 may correspond to a long touch input.

In this case, the mobile terminal can provide a window (not depicted) capable of searching for an image to be added to the additional video track based on the thirteenth input 2030. Hence, as shown in FIG. 20 (c), an additional image 2015 can be displayed on the additional image track 2014. Although it is not depicted in FIG. 20, the mobile terminal can control a transition effect of an image displayed on the additional image track based on an additional input inputted on an editing line of the additional image track 2014. Through the embodiment of FIG. 20, the mobile terminal can provide an additional image to a user when the editing section of the A video and the editing section of the B video are switched from each other.

Figure 21:
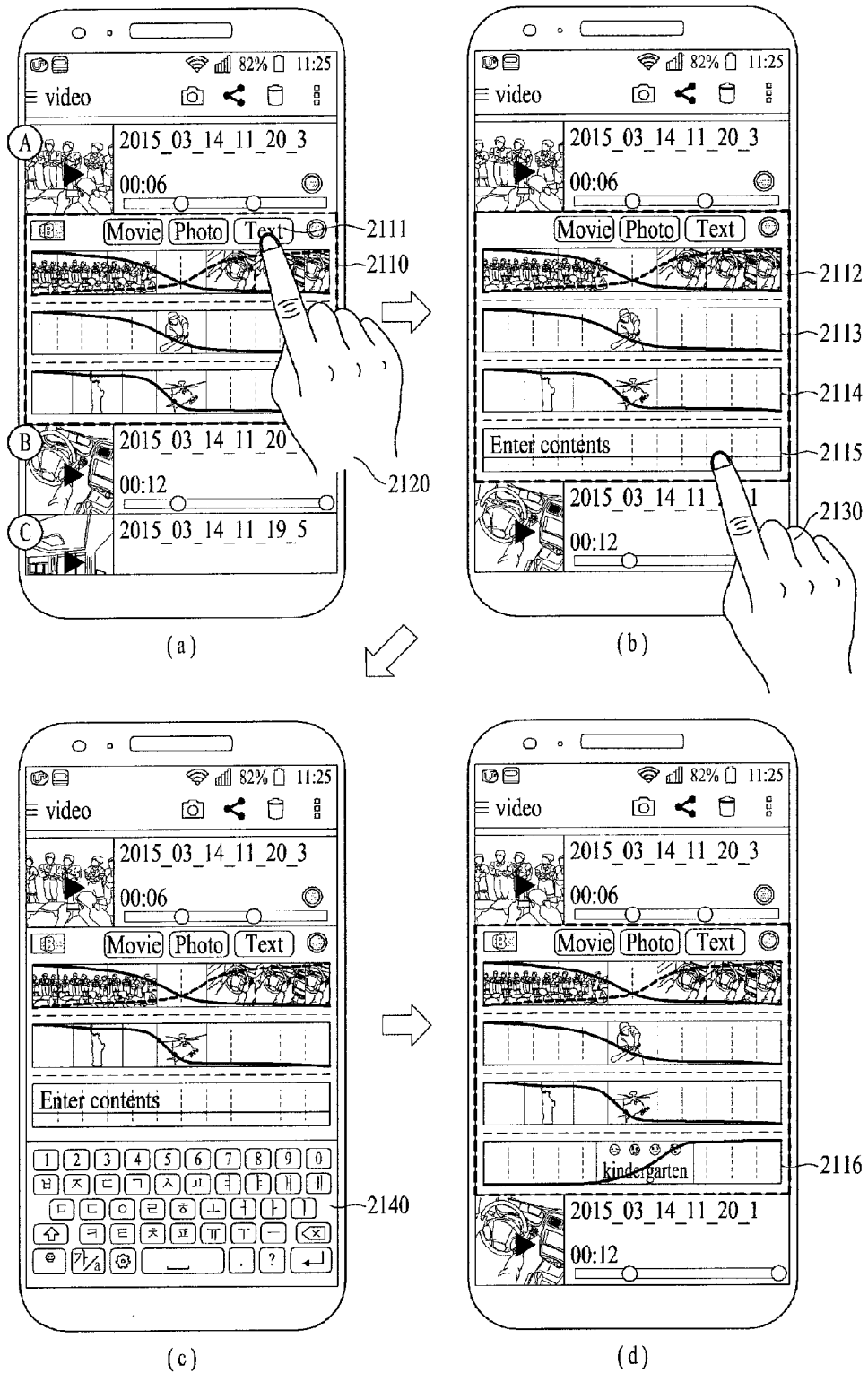
FIG. 21 shows diagrams for a third embodiment of providing an additional editing option for scene transition in the middle of editing at least one video of a mobile terminal according to the present invention.

FIG. 21 is a diagram for a third embodiment of providing an additional editing option for scene transition in the middle of editing at least one video of a mobile terminal according to the present invention.

More specifically, FIG. 21 is a diagram for an embodiment of adding a text when scene transition of at least one video of the mobile terminal is edited. In particular, FIG. 21 shows an embodiment of adding a text to be inserted when a scene is switched from an editing section of A video to an editing section of B video. In FIG. 21, contents overlapped with the contents mentioned earlier in FIG. 19 are omitted.

As shown in FIG. 21 (a), the mobile terminal can receive a twelfth input 2120 inputted on a text add icon 2111. More specifically, the mobile terminal can receive the twelfth input 2020 inputted on the text add icon 2111 while a default track 2112, an additional video track 2113 and an additional image track 2114 are displayed on an editing option 2110 for scene transition. For example, the twelfth input 2120 may correspond to a short touch input.

In this case, as shown in FIG. 21 (b), the mobile terminal can display an additional text track 2115 based on the twelfth input 2120. For example, the additional text track 2115 can be displayed at the bottom of the default track 2112, the additional video track 2113 and the additional image track 2114. And, since the additional text track 2115 currently displays a track and a default editing line only, it is unable to know which text is added and where a text is added.

Subsequently, as shown in FIG. 21 (b), the mobile terminal can receive a thirteenth input 2130 inputted on the additional text track 2115. In this case, the thirteenth input 2030 may correspond to an input for adding a specific text to the additional text track 2115. For example, the thirteenth input 2030 may correspond to a long touch input.

In this case, as shown in FIG. 21 (c), the mobile terminal can provide a text input window 2140 for inputting a text to be provided to the additional text track 2115. The mobile terminal can receive an additional input inputted on the text input window 2140. Hence, as shown in FIG. 20 (d), an additional text 2116 can be displayed on the additional text track 2115. Although it is not depicted in FIG. 21, the mobile terminal can control a transition effect of an image displayed on the additional text track 2115 based on a fourteenth input.

Meanwhile, text information can be automatically inserted into the additional text track 2115 not only by a user input but also by meta file information of at least one of the A video and the B video. For example, the automatically inserted text information can include date information, location information and the like. And, the automatically inserted text information can be inserted not only by an input signal for inputting the text information but also by a signal for moving a scroll bar or pinching-out an editing option for scene transition. Through the embodiment of FIG. 21, the mobile terminal can provide an added text to a user when the editing section of the A video and the editing section of the B video are switched from each other.

FIG. 22 is a diagram for a fourth embodiment of providing an additional editing option for scene transition in the middle of editing at least one video of a mobile terminal according to the present invention.

More specifically, FIG. 22 shows an embodiment of displaying a previously added editing option according to an input signal of a user when a scene of at least one videos of the mobile terminal is edited. In particular, assume that additional video information, additional image information and additional text information are already added by a user.

In one embodiment, the mobile terminal can additionally display additional information one by one whenever an input signal is received on an editing option 2210 for scene transition.

First of all, since an area of a touch screen of the mobile terminal is limited, the mobile terminal is unable to display all editing options associated with videos on the touch screen. For example, as shown in FIG. 22 (*a*), the mobile terminal can display a default track 2211 on the editing option 2210 only when an editing section of the A video and an editing section of the B video are combined with each other. In this case, a user may intend to check remaining additional editing options in the editing option 2210 for scene transition except the default track 2211.

In this case, as shown in FIG. 22 (*a*), the mobile terminal can receive a fifteenth input 2220 inputted on the editing option 2210 for scene transition. In this case, a position on which the fifteenth input 2220 is received may correspond to an area among areas on which the editing option 2210 for scene transition is displayed. For example, the fifteenth input 2220 may correspond to a short touch input. Yet, the fifteenth input 2220 may be non-limited to the short touch input. The fifteenth input 2220 can include various inputs. Subsequently, as shown in FIG. 22 (*b*), the mobile terminal can display additional video information 2212 on the editing option 2210 for scene transition based on the received fifteenth input 2220.

And, as shown in FIG. 22 (*b*), the mobile terminal can receive a sixteenth input 2230 inputted on the editing option 2210 for scene transition. As shown in FIG. 22 (*c*), the mobile terminal can display additional image information 2213 on the editing option 2210 for scene transition based on the received sixteenth input 2230. And, as shown in FIG. 22 (*c*), the mobile terminal can receive a seventeenth input 2240 inputted on the editing option 2210 for scene transition. As shown in FIG. 22 (*d*), the mobile terminal can display additional text information 2214 on the editing option 2210 for scene transition based on the received seventeenth input 2240.

In another embodiment, whenever an input signal inputted on a specific icon among the editing option 2210 for scene transition is received, the mobile terminal can display additional information corresponding to the input signal. For example, although it is not depicted in FIG. 22, referring to FIG. 22 (*a*), if an input signal inputted on a video add icon is received, the mobile terminal can display an additional video track on the editing option 2210 for scene transition. And, in another embodiment, if an input signal inputted on the edition option 2210 for scene transition is received, the mobile terminal can display remaining options not displayed on a touch screen among various options included in the editing option 2210 for scene transition at a time.

Figure 23:
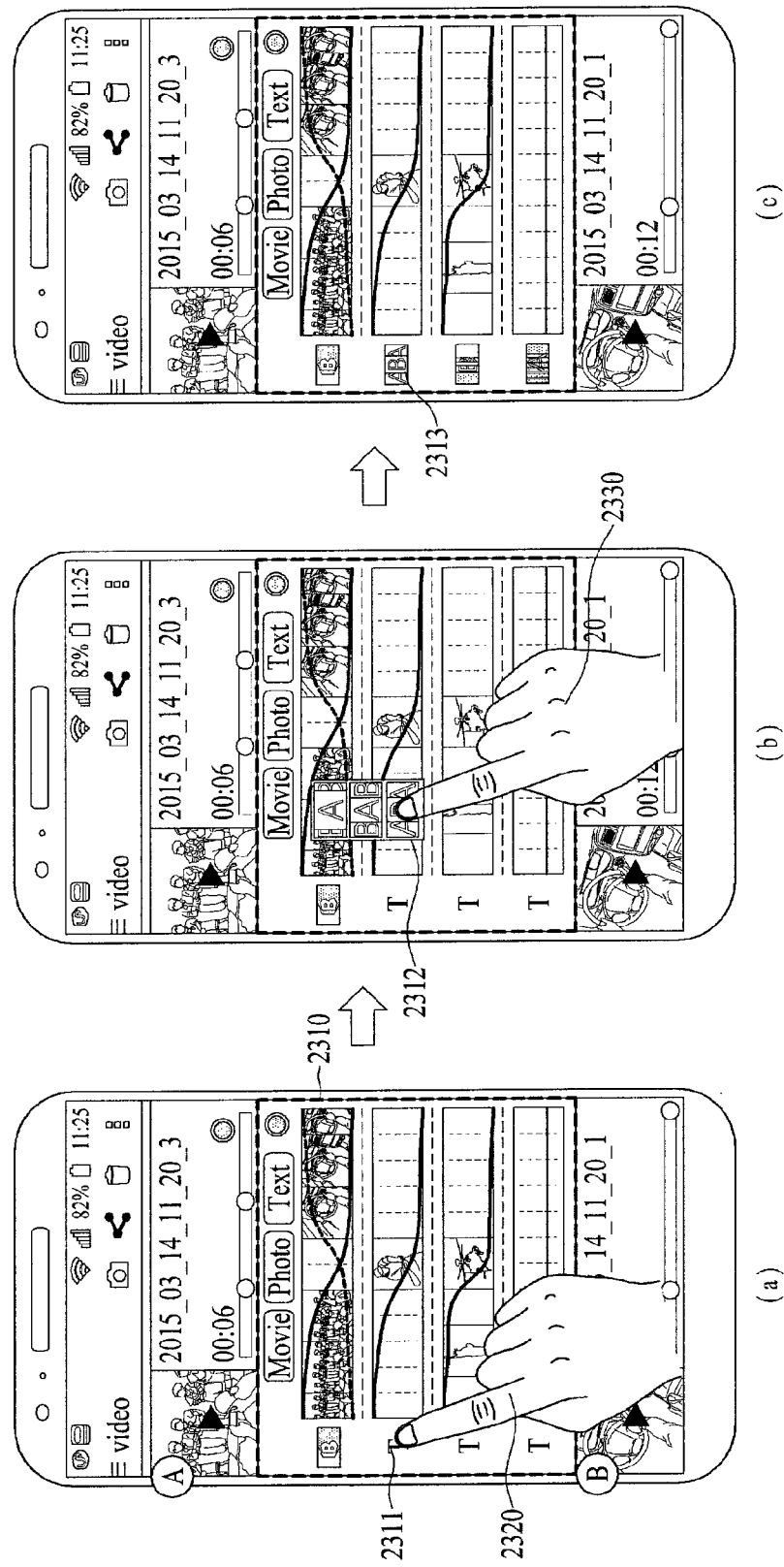
FIG. 23 shows diagrams for a first embodiment of additionally configuring a transition effect in the middle of editing at least one video of a mobile terminal according to the present invention.
Figure 24:
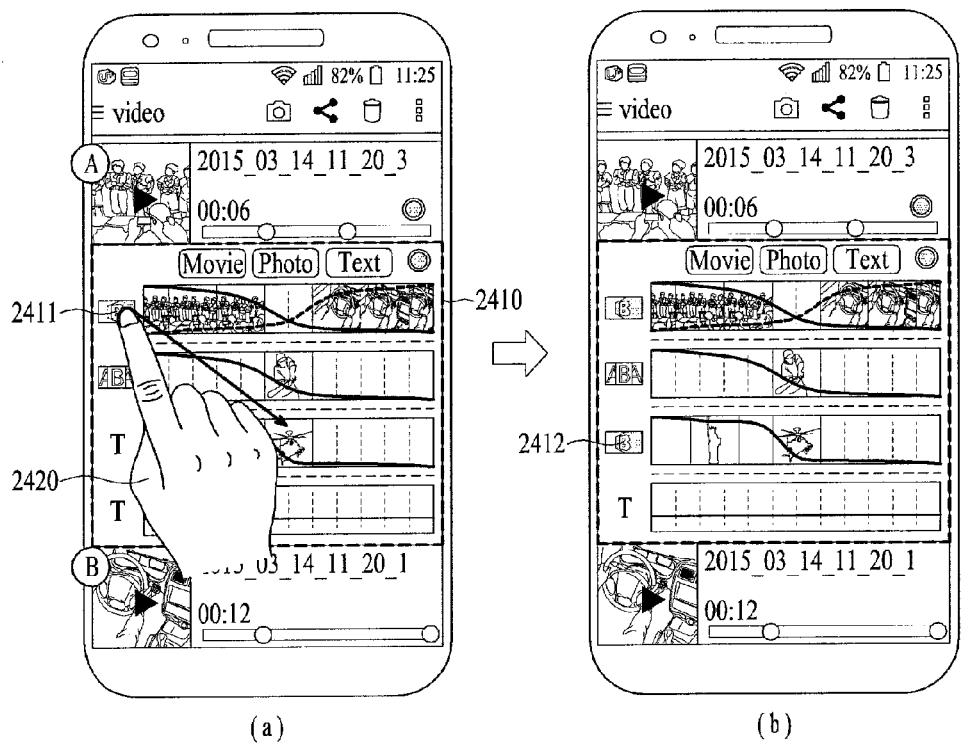
FIG. 24 shows diagrams for a second embodiment of additionally configuring a transition effect in the middle of editing at least one video of a mobile terminal according to the present invention.

In the following, FIG. 23 and FIG. 24 are diagrams for a method of configuring a transition effect of each of additional options in the editing option for scene transition. First of all, FIG. 23 is a diagram for a first embodiment of additionally configuring a transition effect in the middle of editing at least one video of a mobile terminal according to the present invention.

Referring to FIG. 23 (*a*), the mobile terminal can include a plurality of tracks for a transition effect in an editing option 2310 for scene transition as well as a default track. In this case, although an indicator indicating a transition effect is displayed on the default track, a transition effect may not be configured on the remaining tracks 2311.

In this case, the mobile terminal can receive a seventeenth input 2320 to configure a transition effect. In this case, the seventeenth input 2320 can be received on a track to which a transition effect is not set. For example, the seventeenth input 2320 may correspond to a short touch input.

Subsequently, the mobile terminal can display a transition menu add option 2312 based on the seventeenth input 2320. The transition menu add option 2312 can display an effect used for switching a scene corresponding to a track on which the seventeenth input 2320 is received. For example, the transition menu add option 2312 can be displayed in a pop-up form. In this case, various effects used for switching a scene may be identical to a scene transition effect mentioned earlier in FIG. 8 and FIG. 9. In an example of FIG. 23 (*b*), the transition menu add option 2312 can include a default effect, a vertical in effect, a vertical out effect and the like.

Subsequently, as shown in FIG. 23 (*b*), the mobile terminal can receive a nineteenth input 2330 inputted on the transition menu add option 2320. In this case, the nineteenth input 2330 may correspond to a signal for selecting one effect from transition effects displayed on the transition menu add option 2320. For example, the nineteenth input 2330 may correspond to a short touch input. In this case, the mobile terminal can apply a transition effect corresponding to a position on which the nineteenth input 2330 is received to a corresponding track. In particular, as shown in FIG. 23 (*c*), if the aforementioned eighteenth input 2320 and the nineteenth input 2330 are received, the mobile terminal can set a transition effect to each of tracks included in the editing option 2310 for scene transition.

FIG. 24 is a diagram for a second embodiment of additionally configuring a transition effect in the middle of editing at least one videos of a mobile terminal according to the present invention. In the embodiment of FIG. 24, explanation on a part identical to the embodiment of FIG. 23 is omitted at this time.

First of all, the mobile terminal can receive a twentieth input 2420 to configure a transition effect. In this case, the twentieth input 2420 may correspond to a signal for setting a transition effect to a track to which a transition effect is not set among a plurality of tracks included in an editing option 2410 for scene transition.

Meanwhile, the twentieth input 2420 may correspond to a signal configured to identically apply a transition effect in a manner of copying the transition effect. In particular, the mobile terminal can identically apply an effect, which is applied to a track in which a start point of the twentieth input 2420 is included, to a track in which an end point of the twentieth input 2420 is included. For example, as shown in FIG. 24 (a), the twentieth input 2420 may correspond to a drag input for identically applying a transition effect, which is applied to a default track of the editing option 2410 for scene transition, to a third track of the editing option 2410 for scene transition. Hence, as shown in FIG. 24 (b), the mobile terminal can identically apply a transition effect applied to the default track to the third track based on the twentieth input 2420.

Figure 25:
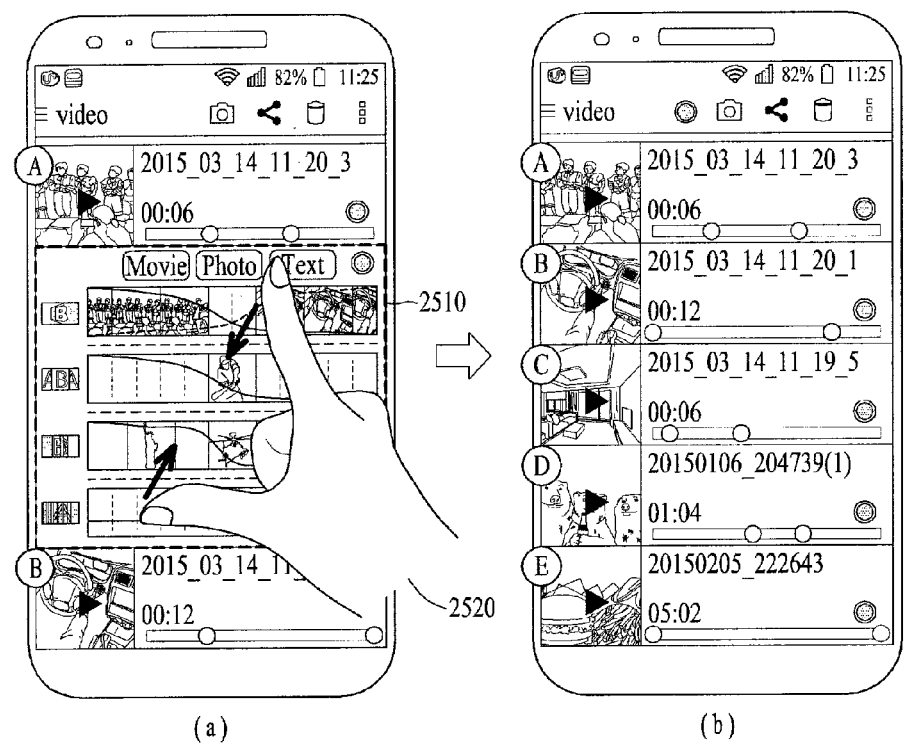
FIG. 25 shows diagrams for an embodiment of eliminating a displayed editing option according to an input in a state that the editing option for scene transition of at least one video of a mobile terminal according to the present invention is displayed.

FIG. 25 is a diagram for an embodiment of eliminating a displayed editing option according to an input signal in a state that the editing option for scene transition of at least one video of a mobile terminal according to the present invention is displayed.

The mobile terminal can receive a twenty-first input 2620 inputted on a video list on which at least one video are displayed in a manner of including an editing option 2610 for scene transition. In this case, the twenty-first input 2620 may correspond to a pinch-out input. And, a position on which the twenty-first input 2620 is received may correspond to one point of the video list. Subsequently, the mobile terminal can delete the displayed editing option 2610 for scene transition based on the twenty-first input 2620.

Meanwhile, the twenty-first input 2620 may correspond to a signal performing a function opposite to a function of the ninth input 1630 shown in FIG. 15. In particular, the ninth input shown in FIG. 15 corresponds to a signal for displaying an editing option for scene transition and the twenty-first input 2620 shown in FIG. 26 may correspond to a signal for eliminating the displayed editing option 2610 for scene transition.

Figure 26:
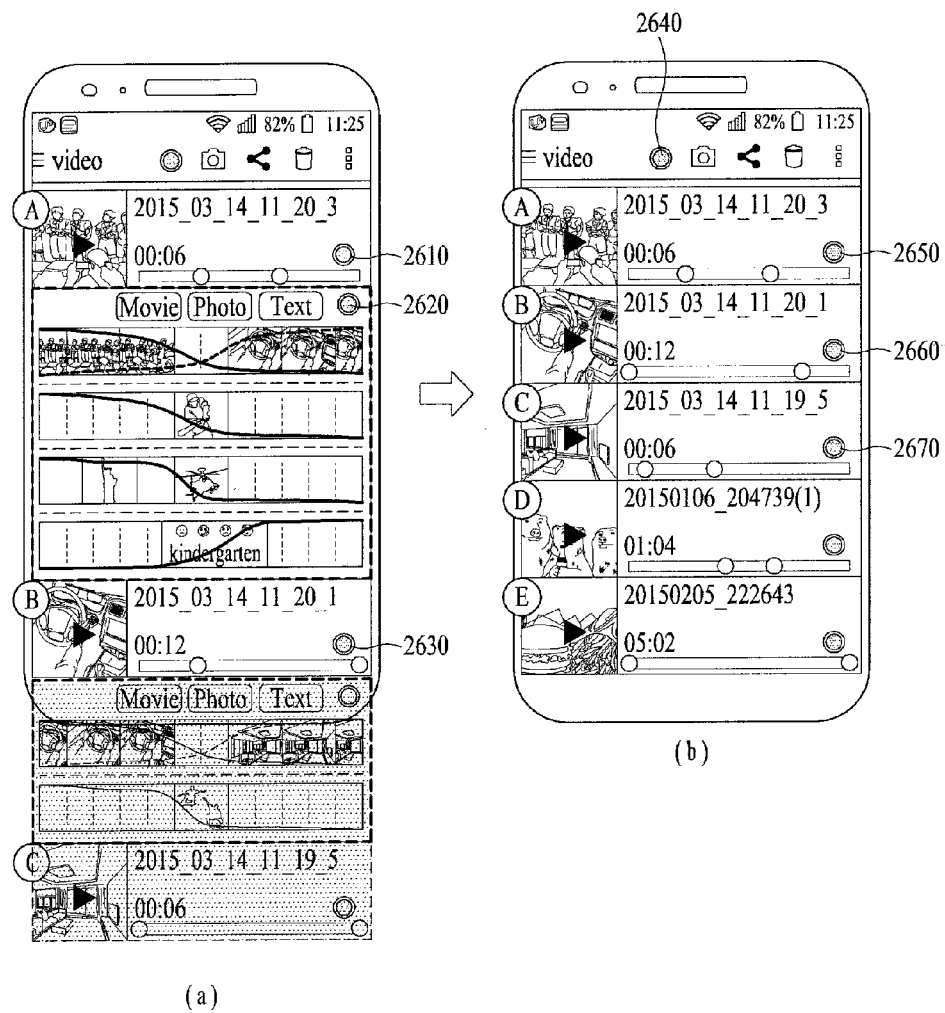
FIG. 26 shows diagrams for an embodiment of encoding and storing an editing section on a video list of a mobile terminal according to the present invention.

FIG. 26 is a diagram for an embodiment of encoding and storing an editing section on a video list of a mobile terminal according to the present invention.

The mobile terminal can encode and store an editing section of at least one videos included in a video list. More specifically, if an input signal, which is inputted on a store icon displayed on the video list, is received, the mobile terminal can encode and store an editing section of a video in response to a position on which the input signal is received.

In one embodiment, the mobile terminal can separately encode an editing section of each video and store the editing section. For example, referring to FIG. 26 (a), if an input signal (not depicted) inputted on a store icon 2610 of A video is received, the mobile terminal separately encodes an editing section of the A video and may be able to store the editing section of the A video. And, for example, referring to FIG. 26 (b), if an input signal (not depicted) inputted on a store icon 2660 of B video is received, the mobile terminal separately encodes an editing section of the B video and may be able to store the editing section of the B video. In this case, an input signal for separately storing an editing section of each video corresponds to a single touch input and may be able to include a short touch, a long touch and the like.

In another embodiment, the mobile terminal can encode and store a video of which editing section of at least one video are combined with each other. For example, referring to FIG. 26 (a), if an input signal (not depicted) inputted on a store icon 2620, which is displayed on an editing option for scene transition of A video and B video, is received, the mobile terminal can encode a video of which an editing section of the A video and an editing section of the B video are combined with each other and may be then able to store the video. In this case, the input signal (not depicted) may correspond to a single touch input. And, for example, referring to FIG. 26 (a), if an input signal inputted on a store icon 2610 of the A video and a store icon 2630 of the B video is received, the mobile terminal can encode a video of which an editing section of the A video and an editing section of the B video are combined with each other and may be then able to store the video. In this case, the input signal (not depicted) may correspond to a multi touch input.

And, for example, referring to FIG. 26 (b), if an input signal (not depicted) inputted on a store icon 2640 positioned at the top of the video list is received, the mobile terminal can encode a video of which an editing section of the A video to an editing section of D video are combined with each other and may be then able to store the video. And, for example, referring to FIG. 26 (b), if an input signal inputted on a store icon 2650 of the A video and a store icon 2670 of C video is received, the mobile terminal can encode a video of which an editing section of the A video to an editing section of C video are combined with each other and may be then able to store the video. In this case, the input signal (not depicted) inputted on the store icon 2650 of the A video and the store icon 2670 of the C video may correspond to a multi touch input.

In the following, FIGS. 27 to 34 show a method of playing an editing section of at least one video on a video list in which at least one video are included. In particular, a method of playing a video of which a scene transition effect is added to editing section of at least one video is explained in the following. In the following description, a twenty-second input and a twenty-third input correspond to input signals for playing an editing section.

Figure 27:
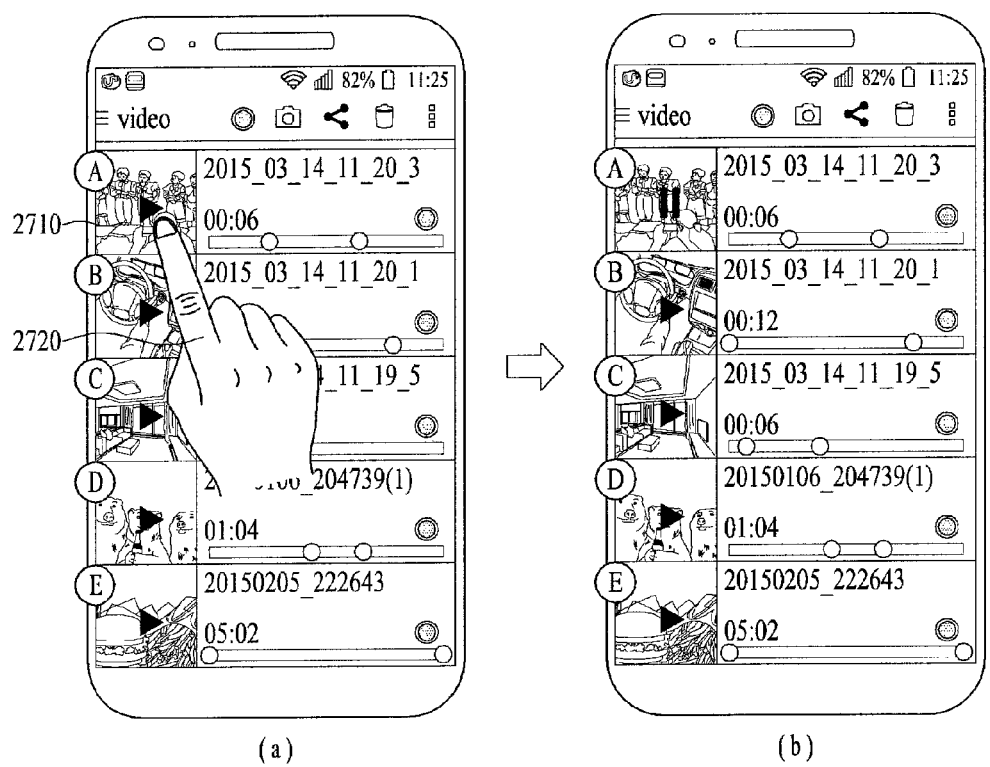
FIG. 27 shows diagrams for a first embodiment of playing an editing section on a video list of a mobile terminal according to the present invention.

First of all, FIG. 27 is a diagram for a first embodiment of playing an editing section on a video list of a mobile terminal according to the present invention. More specifically, FIG. 27 shows an embodiment of playing a video including a single editing section only on the video list of the mobile terminal.

The mobile terminal can receive a twenty-second input 2710 inputted on a video among at least one video included in a video list. For example, as shown in FIG. 27 (a), the mobile terminal can receive the twenty-second input 2710 inputted on an area on which a thumbnail image of A video is displayed. For example, the twenty-second input 2720 may correspond to a short touch input. In this case, a position on which the twenty-second input is received may correspond to one point of a video to be played.

In this case, the mobile terminal can play an editing section of a video corresponding to the position on which the twenty-second input 2710 is received at a position on which the thumbnail image is displayed corresponding to the position on which the twenty-second input 2710 is received. For example, as shown in FIG. 27 (b), the mobile terminal can play an editing section of the A video only on which the twenty-second input 2710 is received at the position on which the thumbnail image is displayed.

Figure 28:
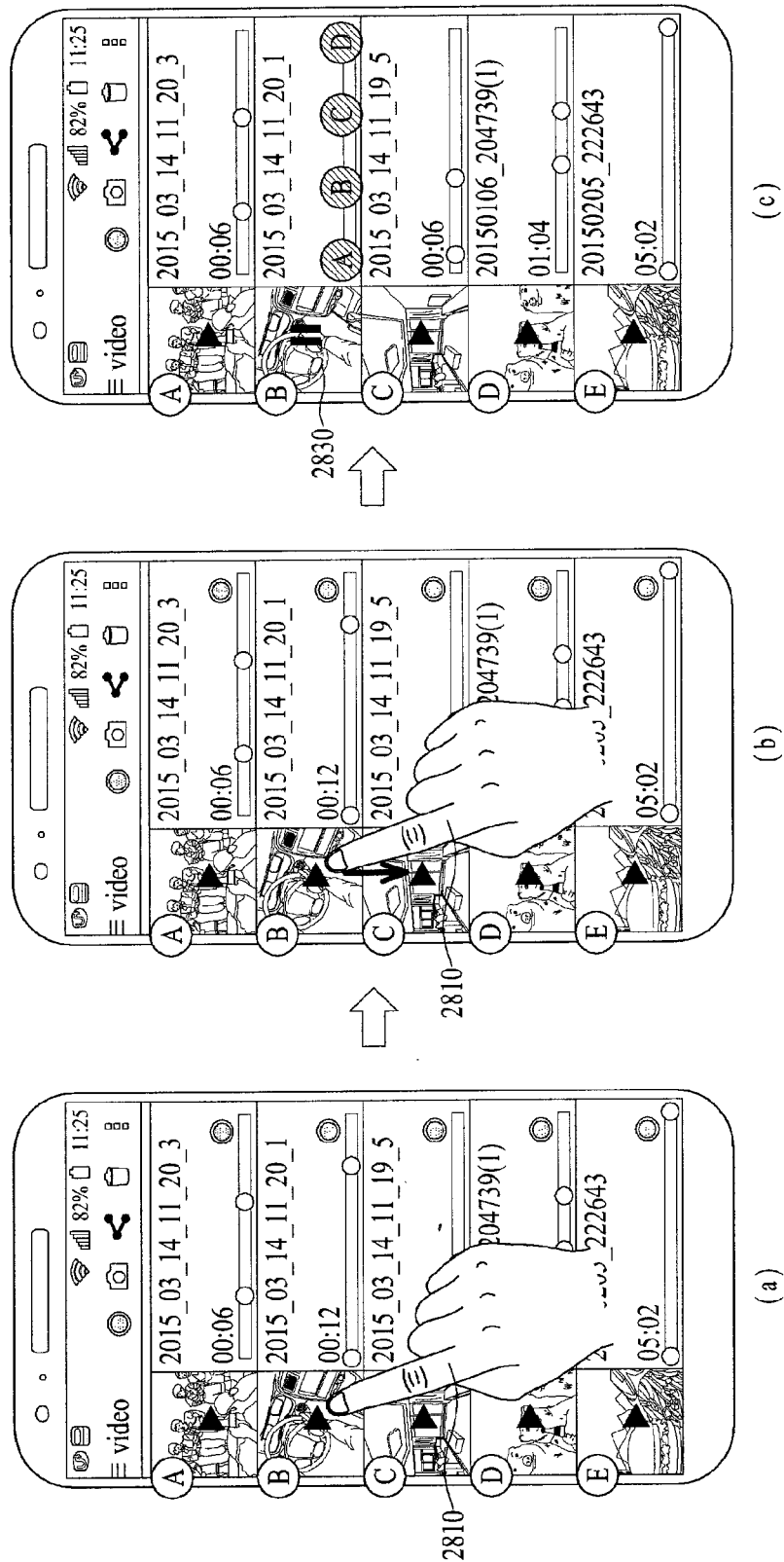
FIG. 28 shows diagrams for a second embodiment of playing an editing section on a video list of a mobile terminal according to the present invention.

FIG. 28 is a diagram for a second embodiment of playing an editing section on a video list of a mobile terminal according to the present invention. More specifically, FIG. 28 shows an embodiment of playing a video of which a plurality of editing section are combined with each other on a video list of the mobile terminal.

The mobile terminal can receive a twenty-second input 2810 inputted on a video among at least one video included in a video list. For example, as shown in FIG. 28 (a), the mobile terminal can receive the twenty-second input 2810 inputted on a position on which a thumbnail image of B video is displayed. For example, the twenty-second input 2810 may correspond to a short touch input.

Subsequently, the mobile terminal can receive a twenty-third input 2820 in succession to the twenty-second input 2810. For example, as shown in FIG. 28 (*b*), the mobile terminal can receive the twenty-third input 2820 moving to down direction in succession to the twenty-second input 2810 inputted on the B video. For example, the twenty-third input 2820 may correspond to a drag touch input. Although it is not depicted in FIG. 28, the twenty-second input 2810 and the twenty-third input 2820 may correspond to a multi touch input inputted on a start point indicator of the B video and an end point indicator of E video.

In this case, the mobile terminal can continuously play an editing section of a video corresponding to a position on which the twenty-second input 2810 is received and an editing section of a video positioned thereafter at a position on which a thumbnail image of a video corresponding to the position on which the twenty-second input 2810 is received is displayed. For example, as shown in FIG. 28 (*c*), the mobile terminal can continuously play an editing section of A video, an editing section of B video, an editing section of C video and an editing section of D video at a position 2830 on which a thumbnail image of the B video is displayed.

Figure 29:
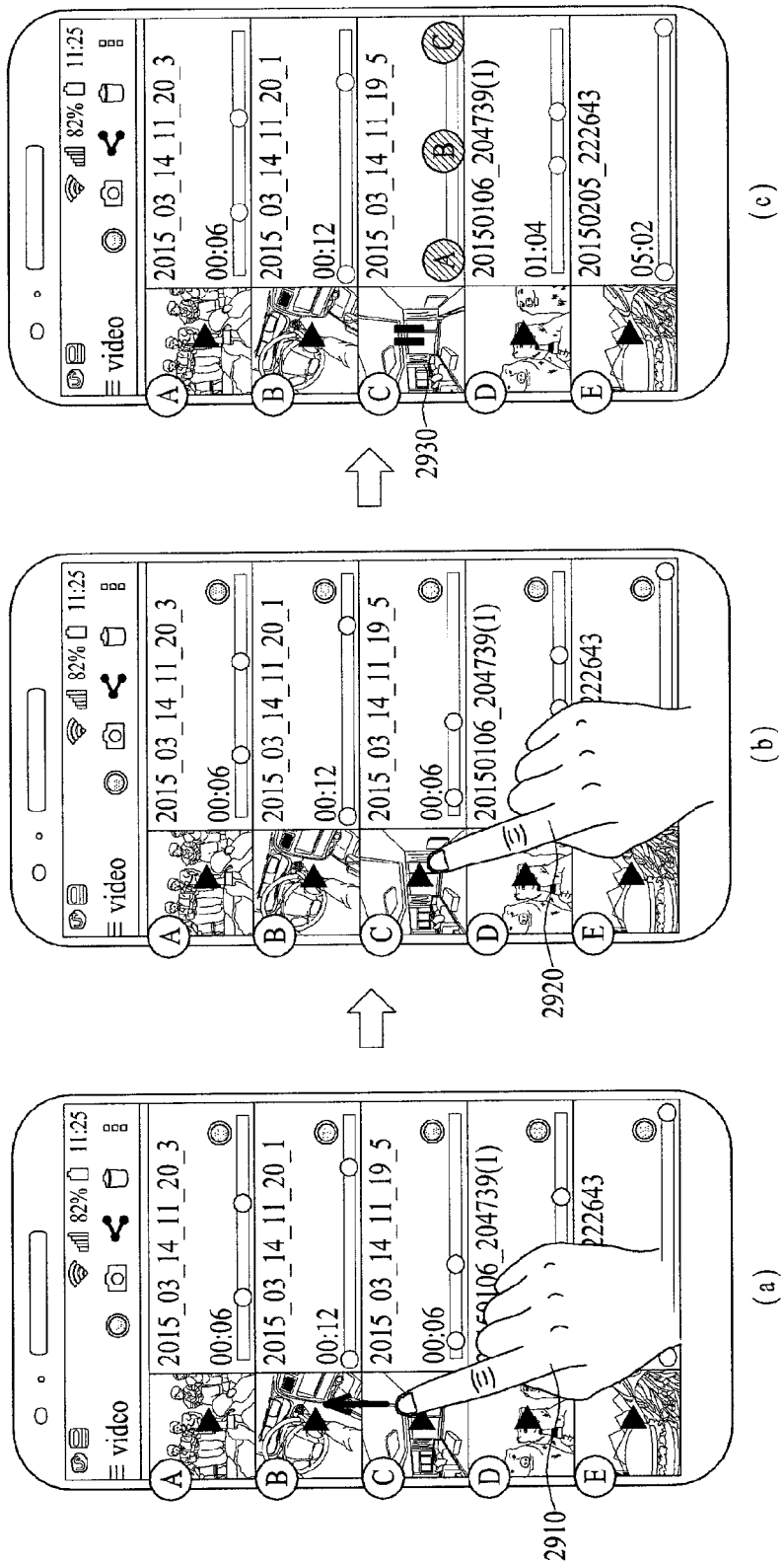
FIG. 29 shows diagrams for a third embodiment of playing an editing section on a video list of a mobile terminal according to the present invention.

FIG. 29 is a diagram for a third embodiment of playing an editing section on a video list of a mobile terminal according to the present invention. More specifically, FIG. 29 shows an embodiment of playing a video of which a plurality of editing section are combined with each other on a video list of the mobile terminal The mobile terminal can receive a twenty-second input 2910 inputted on a video among at least one video included in a video list. For example, as shown in FIG. 29 (*a*), the mobile terminal can receive the twenty-second input 2910 inputted on a position on which a thumbnail image of C video is displayed. For example, the twenty-second input 2910 may correspond to a short touch input.

Subsequently, the mobile terminal can receive a twenty-third input 2920 in succession to the twenty-second input 2910. For example, as shown in FIG. 29 (*b*), the mobile terminal can receive the twenty-third input 2920 moving to up direction in succession to the twenty-second input 2910 inputted on the C video. For example, the twenty-third input 2920 may correspond to a drag touch input. Although it is not depicted in FIG. 29, the twenty-second input 2910 and the twenty-third input 2920 may correspond to 3 multi touch inputs inputted on the A video, the B video and the C video.

In this case, the mobile terminal can continuously play an editing section of a video positioned at the upper most of a video list to an editing section of a video corresponding to a position on which the twenty-second input 2910 is received at a position on which a thumbnail image of a video is displayed corresponding to the position on which the twenty-second input 2910 is received. For example, as shown in FIG. 29 (*c*), the mobile terminal can continuously play an editing section of A video, an editing section of B video and an editing section of C video at a position 2930 on which a thumbnail image of the C video is displayed.

Figure 30:
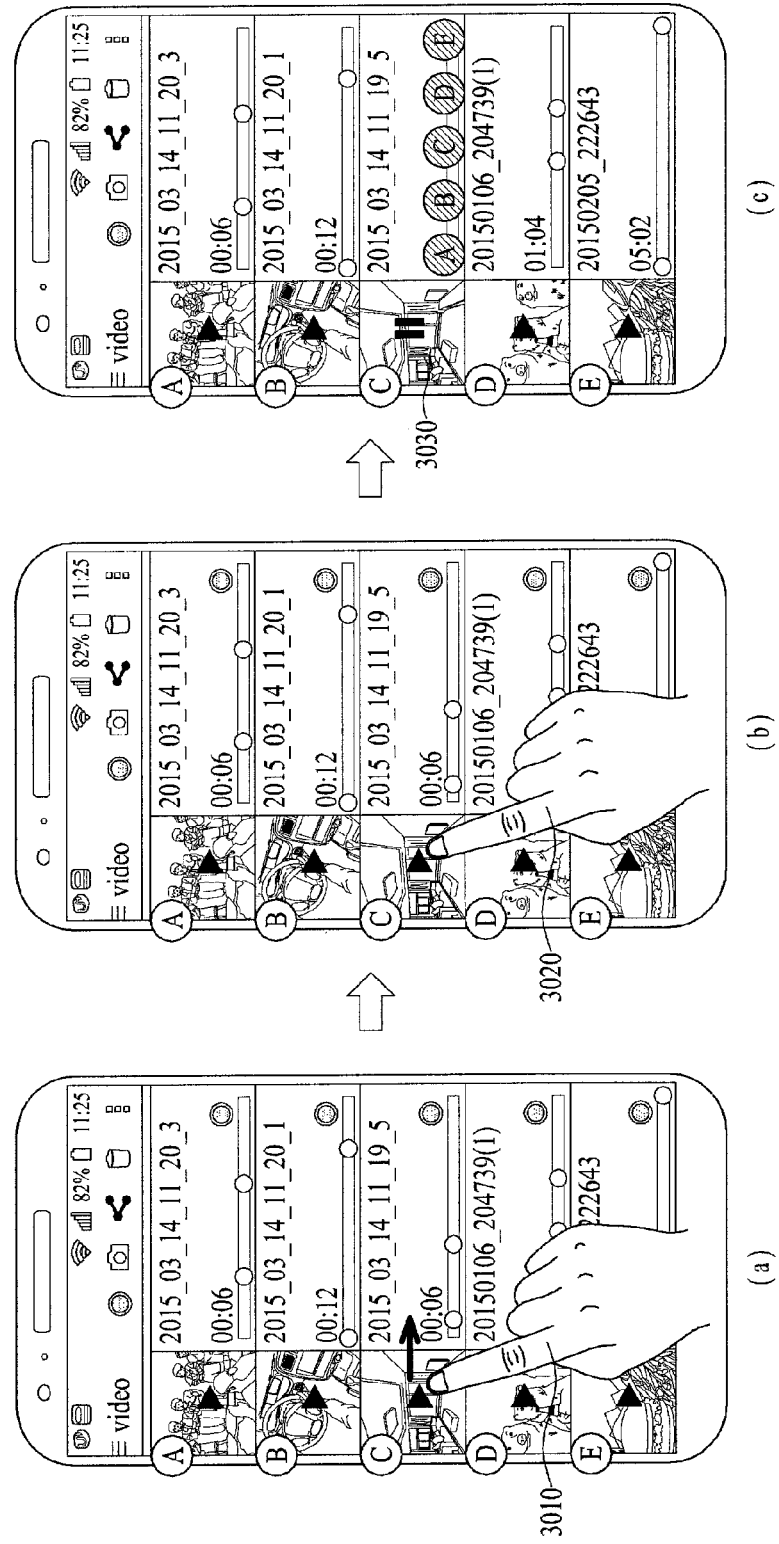
FIG. 30 shows diagrams for a fourth embodiment of playing an editing section on a video list of a mobile terminal according to the present invention.

FIG. 30 is a diagram for a fourth embodiment of playing an editing section on a video list of a mobile terminal according to the present invention. More specifically, FIG. 30 shows a third embodiment of playing an editing section on a video list of the mobile terminal according to the present invention.

The mobile terminal can receive a twenty-second input 3010 inputted on a video among at least one video included in a video list. For example, as shown in FIG. 30 (*a*), the mobile terminal can receive the twenty-second input 3010 inputted on a position on which a thumbnail image of C video is displayed. Meanwhile, in the embodiment of FIG. 30, a position on which the twenty-second input 3010 is received may correspond to an area of the video list.

Subsequently, the mobile terminal can receive a twenty-third input 3020 in succession to the twenty-second input 3010. For example, as shown in FIG. 30 (*b*), the mobile terminal can receive the twenty-third input 3020 moving to right direction in succession to the twenty-second input 3010 inputted on the C video. Meanwhile, the twenty-third input 3020 can include not only a drag touch input moving to the right direction but also a drag touch input moving to the left direction. Although it is not depicted in FIG. 30, the twenty-second input 3010 and the twenty-third input 3020 may correspond to a single touch input or a drag touch input inputted on at least one of a start point indicator and an end point indicator of an editing section of at least one video.

In this case, the mobile terminal can continuously play editing section of all videos included in a video list at a position on which a thumbnail image of a video is displayed corresponding to the position on which the twenty-second input 3010 is received. For example, as shown in FIG. 30 (*c*), the mobile terminal can continuously play an editing section of A video, an editing section of B video, an editing section of C video and an editing section of E video at a position 3030 on which a thumbnail image of the C video is displayed.

Figure 31:
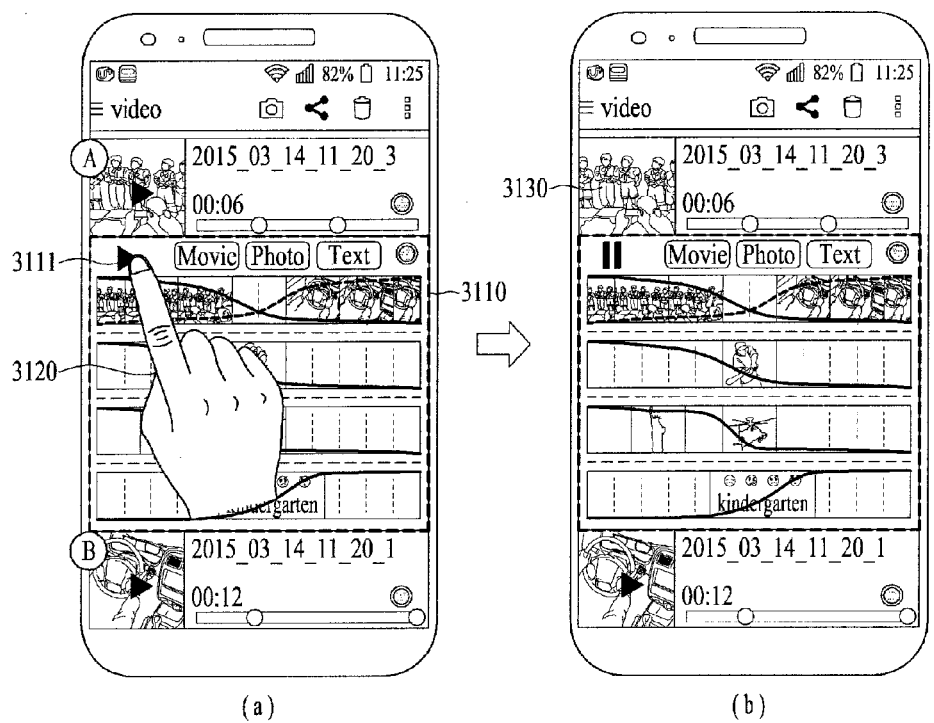
FIG. 31 shows diagrams for a fifth embodiment of playing an editing section on a video list of a mobile terminal according to the present invention.

FIG. 31 is a diagram for a fifth embodiment of playing an editing section on a video list of a mobile terminal according to the present invention.

The mobile terminal can receive a twenty-second input 3120 inputted on an editing section 3110 for scene transition of at least one video included in a video list. For example, as shown in FIG. 31 (*a*), the mobile terminal can receive the twenty-second input 3120 inputted on a playback icon 3111 displayed on the editing section 3110 for scene transition. In this case, the twenty-second input 3120 may correspond to a short touch input.

In this case, the mobile terminal can play an editing section of a video corresponding to a position on which the twenty-second input 3120 is received at a position 3130 on which a thumbnail image of the video corresponding to the position on which the twenty-second input is received is displayed. In this case, the position on which the twenty-second input 3120 is received may correspond to an area of the edition option 3110 for switching a scene between an editing section of A video and an editing section of B video. Hence, the video corresponding to the position on which the twenty-second input 3120 is received may correspond to the A video and the B video. For example, as shown in FIG. 31 (*b*), the mobile terminal can play a video of which the editing section of the A video and the editing section of the B video are combined with each other at the position 3130 on which a thumbnail image of the A video is displayed. And, for example, although it is not depicted in FIG. 31, the mobile terminal can play a video of which the editing section of the A video and the editing section of the B video are combined with each other at a position (not depicted) on which a thumbnail image of the B video is displayed.

Figure 32:
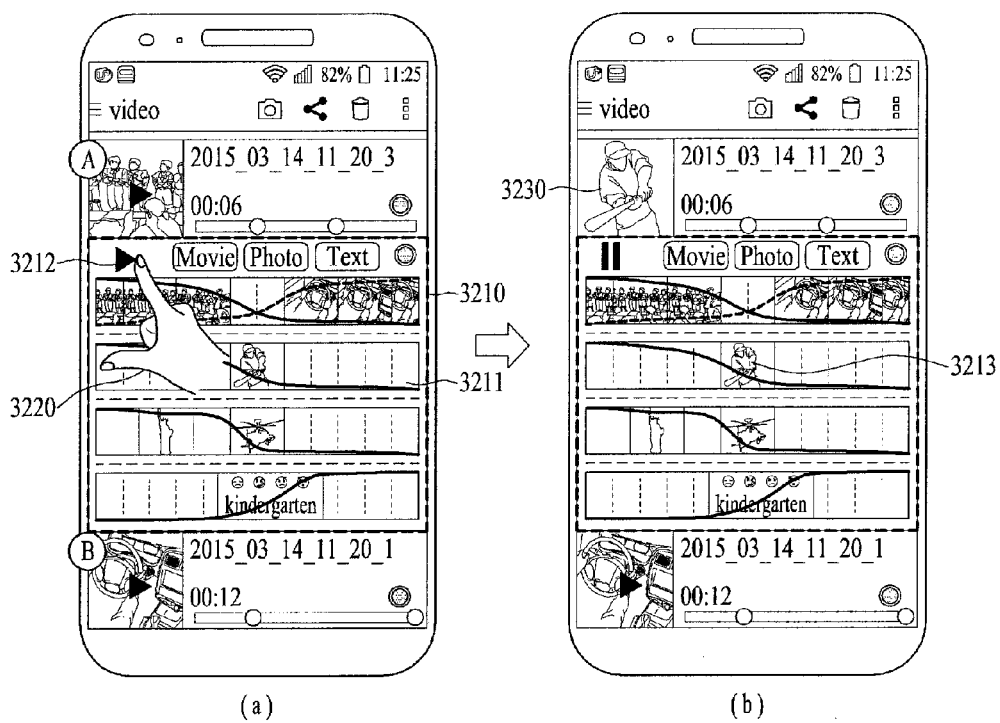
FIG. 32 shows diagrams for a sixth embodiment of playing an editing section on a video list of a mobile terminal according to the present invention.

FIG. 32 is a diagram for a sixth embodiment of playing an editing section on a video list of a mobile terminal according to the present invention.

The mobile terminal can receive a twenty-second input 3220 inputted on an editing section 3210 for scene transition of at least one video included in a video list. For example, as shown in FIG. 32 (*a*), the mobile terminal can receive the twenty-second input 3220 inputted on the editing section 3210 for scene transition between A video and B video. In this case, the twenty-second input may correspond to a multi touch input. For example, as shown in FIG. 32 (a), the multi touch input may correspond to an input inputted on a specific track 3211 and a playback icon 3212 included in the editing section 3210 for scene transition between the A video and the B video.

In this case, the mobile terminal can play information corresponding to a position on which the twenty-second input 3220 is received at a position 3230 on which a thumbnail image of a video corresponding to the position on which the twenty-second input 3220 is received is displayed. In an embodiment of FIG. 32, the video corresponding to the position on which the twenty-second input 3220 is received may correspond to the A video and the B video. And, as shown in FIG. 32 (a), the information corresponding to the position on which the twenty-second input 3220 is received may correspond to information included in an additional track 3211 among the editing option 3210 for scene transition, i.e., additional video information. Hence, as shown in FIG. 32 (b), the mobile terminal can play additional video information 3213 at a position 3230 on which a thumbnail image of the A video is displayed. And, although it is not depicted in FIG. 32, the mobile terminal can play the additional video information 3213 at a position (not depicted) on which a thumbnail image of the B video is displayed.

In particular, according to the embodiment of FIG. 32, if a multi touch input of a user is detected, the mobile terminal can provide the user with a preview of additional information included in a specific track on which an input is received among an editing option for scene transition.

Figure 33:
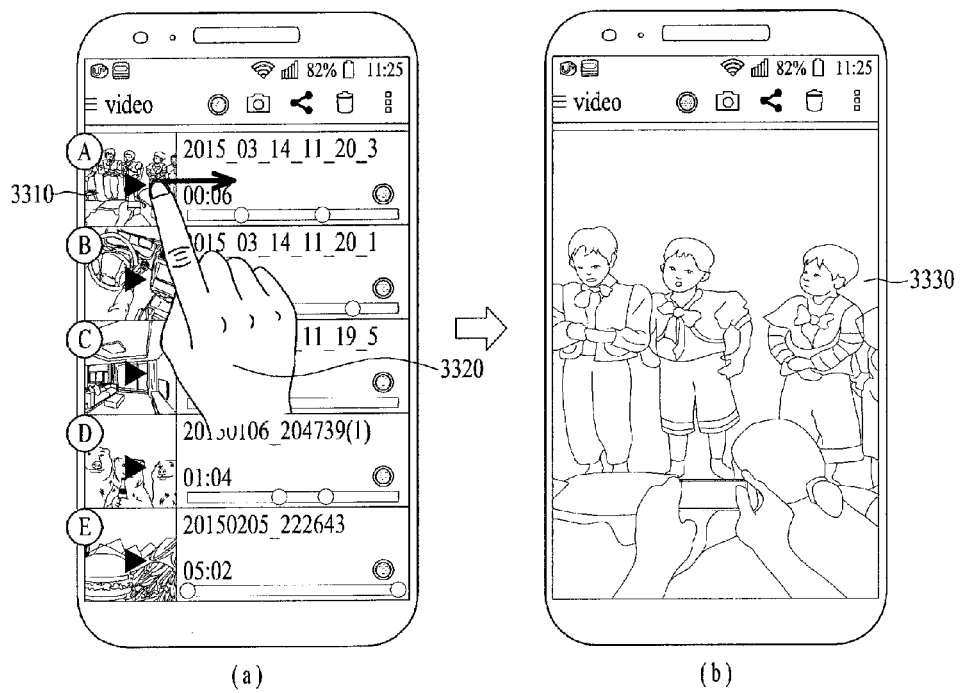
FIG. 33 shows diagrams for a seventh embodiment of playing an editing section on a video list of a mobile terminal according to the present invention.

FIG. 33 is a diagram for a seventh embodiment of playing an editing section on a video list of a mobile terminal according to the present invention.

As mentioned earlier in FIG. 27 to FIG. 30, if a twenty-second input is received on a video among at least one video included in a video list, the mobile terminal can play an editing section of a video corresponding to a position on which the twenty-second input is received at a position where a thumbnail image corresponding to the position on which the twenty-second input is received is displayed.

Meanwhile, the mobile terminal can receive a twenty-fourth input 3320 while an editing section of at least one video is played. More specifically, the mobile terminal can receive the twenty-fourth input 3320 inputted on an area on which the editing section of the video is played in the middle of playing the editing section of the video. In an embodiment of FIG. 33 (a), the mobile terminal can receive the twenty-fourth input 3320 inputted on an area on which an editing section of A video is played in the middle of playing the editing section of the A video. In this case, the twenty-fourth input 3320 may correspond to a drag touch input.

In this case, the mobile terminal can play the editing section of the video in playing in a manner of magnifying the editing section of the video. In particular, referring to the embodiment of FIG. 33 (b), the mobile terminal can play the editing section of the A video in a manner of enlarging 3330 the editing section of the A video.

Figure 34:
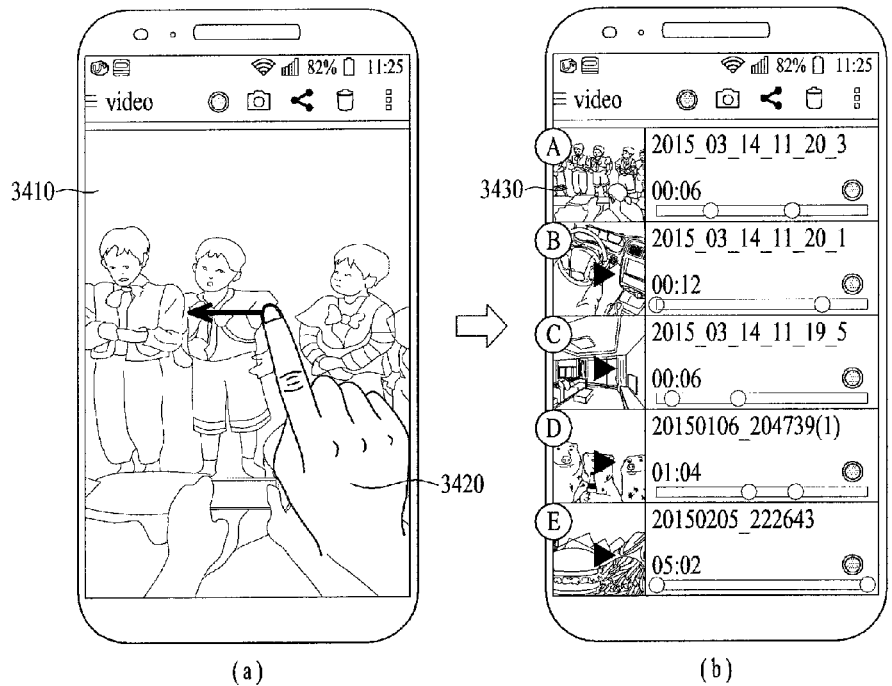
FIG. 34 shows diagrams for an eighth embodiment of playing an editing section on a video list of a mobile terminal according to the present invention.

FIG. 34 is a diagram for an eighth embodiment of playing an editing section on a video list of a mobile terminal according to the present invention. An embodiment of FIG. 34 shows a case of receiving a twenty-fifth input in the middle of playing an editing section of a video in a manner of enlarging the editing section of the video based on the twenty-fourth input mentioned earlier in FIG. 33, which is received in the middle of playing the editing section of the video.

In the middle of playing an editing section of a video in a manner of enlarging 3410 the editing section of the video, the mobile terminal can receive a twenty-fifth input 3420. In an embodiment of FIG. 34 (a), the mobile terminal can receive the twenty-fifth input 3420 inputted on an area 3410 on which an editing section of A video is played in the middle of playing the editing section of the A video in a manner of enlarging 3410 the editing section of the A video. In this case, the twenty-fifth input 3420 may correspond to a drag input. And, the twenty-fifth input 3420 may correspond to a drag input in a direction opposite to a direction of the twenty-fourth input mentioned earlier in FIG. 33. In particular, the twenty-fourth input corresponds to an input for enlarging and playing an editing section of a video and the twenty-fifth input 3420 may correspond to an input for reducing and playing an editing section of a video.

In this case, the mobile terminal can play an editing section of a video, which is playing in a manner of being enlarged, in a manner of reducing the editing section of the video. In particular, referring to an embodiment of FIG. 34, the mobile terminal can continuously play the editing section of the A video at a position 3430 on which a thumbnail image is displayed of the video list in a manner of reducing the editing section of the A video, which is currently displayed in a manner of being enlarged.

Through the embodiments mentioned earlier in FIG. 27 to FIG. 35, a user can easily watch an editing section of at least one video included in a video list via a simple and intuitive touch input.

Figure 35:
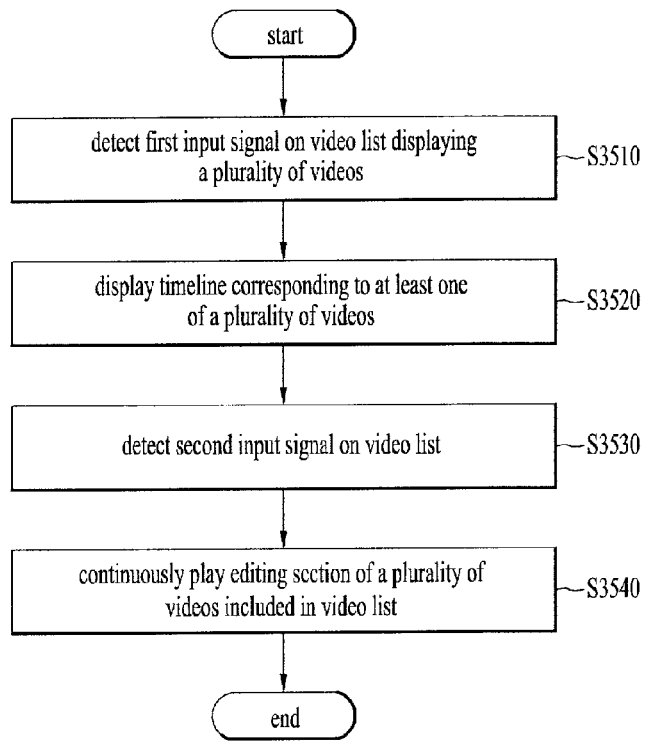
FIG. 35 is a flowchart for a control method of a mobile terminal according to the present invention.

FIG. 35 is a flowchart for a control method of a mobile terminal according to the present invention. Each step of FIG. 35 described in the following can be controlled by the controller 180 of the mobile terminal shown in FIG. 1a.

First of all, the mobile terminal can receive a first input inputted on a video list configured to display at least one video [S3510]. As mentioned earlier in FIG. 5, the first input may correspond to a drag touch input in right direction or left direction.

Subsequently, the mobile terminal can display a timeline corresponding to at least one video based on the received first input [S3520]. In this case, the timeline can include an editing section of at least one video, a stat point indicator of the editing section and an end point indicator.

Subsequently, the mobile terminal can receive a second input inputted on the video list [S3530]. As mentioned earlier in FIG. 27 to FIG. 32, the second input may correspond to a signal for playing editing section of at least one video included in the video list. For example, the second input may correspond to a touch and drag input, a short touch input, a multi touch input and the like.

Subsequently, the mobile terminal can continuously play the editing section of at least one video included in the video list based on the received second input [S3540]. More specifically, the mobile terminal can play the editing section of at least one video included in the video list at an area where a thumbnail image of a video corresponding to a position on which the second input is received is displayed.

In one embodiment, as mentioned earlier in FIG. 27, if the second input corresponds to a single touch input inputted on a specific video, the mobile terminal can play an editing section of a video only corresponding to a position on which the second input is received at an area where a thumbnail image of a video corresponding to the position on which the second input is received is displayed. In another embodiment, as mentioned earlier in FIG. 28, if the second input corresponds to a touch input inputted on a specific video and a drag touch input in down direction contiguous to the touch input, the mobile terminal can play a video of which an editing section of a video corresponding to a position on which the touch input is received and an editing section of a last video are combined with each other at an area where a thumbnail image of a video corresponding to a position on which the touch input is received is displayed.

And, in another embodiment, as mentioned earlier in FIG. 29, if the second input corresponds to a touch input inputted on a specific video and a drag touch input in up direction contiguous to the touch input, the mobile terminal can play a video of which an editing section of a first video displayed on the list and an editing section of a last video corresponding to a position on which the second touch input is received are combined with each other at an area where a thumbnail image of a video corresponding to a position on which the touch input is received is displayed. And, in another embodiment, as mentioned earlier in FIG. 31, if the second input corresponds to a touch input inputted on a specific video and a drag touch input in left/right direction contiguous to the touch input, the mobile terminal can play a video of which all editing section of at least one video included in the list at an area where a thumbnail image of a video corresponding to a position on which the touch input is received is displayed. Meanwhile, the present invention may be non-limited by the aforementioned embodiments of the touch input. The touch input can be implemented in various ways according to user configuration or device configuration.

Figure 36:
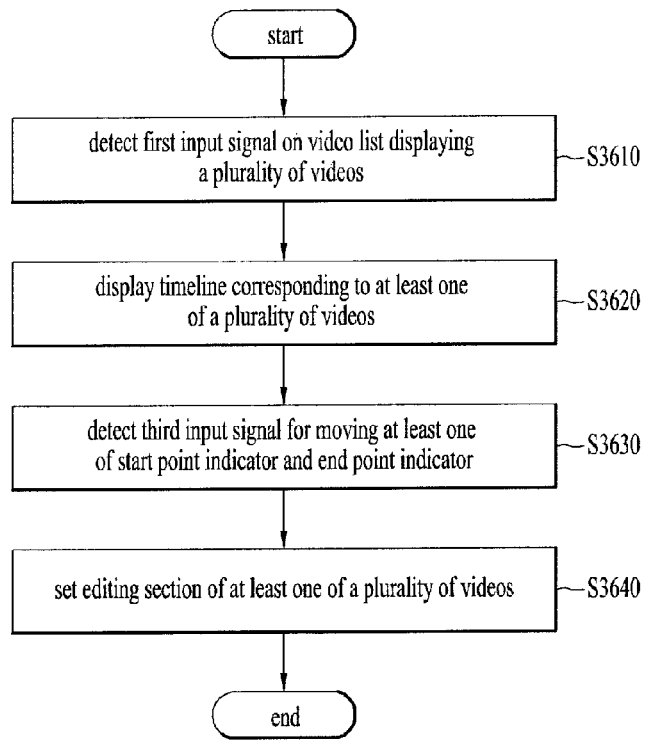
FIG. 36 is a flowchart for a control method of a mobile terminal according to the present invention.

FIG. 36 is a flowchart for a control method of a mobile terminal according to the present invention. Each step of FIG. 36 described in the following can be controlled by the controller 180 of the mobile terminal shown in FIG. 1a. In an embodiment of FIG. 36, explanation on a part identical or corresponding to the embodiment of FIG. 35 is omitted at this time.

First of all, the mobile terminal can receive a first input inputted on a video list configured to display at least one video [S3610]. Subsequently, the mobile terminal can display a timeline corresponding to at least one video based on the received first input [S3620]. In this case, the timeline can include an editing section of at least one video, a stat point indicator of the editing section and an end point indicator.

Subsequently, the mobile terminal can receive a third input for moving at least one of the start point indicator and the end point indicator [S3630]. As mentioned earlier in FIG. 7, the second input may correspond to drag touch input.

Subsequently, the mobile terminal can configure editing section of at least one video [S3640]. In this case, as mentioned earlier in FIG. 6, the mobile terminal can display at least one frame images adjacent to a point on which the second input is sensed on the point on which the second input is sensed. And, the mobile terminal can configure the editing section of at least one video included in the video list in a manner of repeating the aforementioned process.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Accordingly, the present invention is directed to an apparatus and method thereof that substantially obviate one or more problems due to limitations and disadvantages of the related art. An object of the present invention is to solve the aforementioned problem and other problems. Another object of the present invention is to provide a mobile terminal generating a compressed file on a video list in a manner of compressing a plurality of videos and a method of controlling therefor.

Another object of the present invention is to provide a mobile terminal capable of performing editing section configuration, transition effect configuration and the like for each of at least one video on a video list and a method of controlling therefor.

When images preferred by a user are variously captured, the other object of the present invention is to provide a mobile terminal capable of generating a video in a manner of combining parts preferred by the user with each other from the images and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal, comprising a touch screen to display a video list that includes at least one video; and a controller configured to: display a timeline corresponding to the at least one video according to a first input at the video list, wherein the timeline includes at least one of a start point indicator and an end point indicator to identify an editing section of the at least one video, and, play, on the touch screen, the editing section of the at least one video contained in the video list based on a second input at the video list. To further achieve these objects and other advantages and in accordance with the purpose of the invention, as embodied and broadly described herein, according to a different embodiment, a method of controlling a mobile terminal, comprising: receiving a first input at a video list that includes at least one video; displaying a timeline based on the received first input, the displayed timeline including at least one of a start point indicator and an end point to identify an editing section of the at least one video; receiving a second input at the displayed video list; and playing the editing section of the at least one video continuously based on the received second input.

Advantageous effects for a mobile terminal according to the present invention and a method of controlling therefor are described in the following.

According to at least one embodiment of the present invention, it is able to provide a mobile terminal capable of editing each video on a video list on which at least one videos are displayed and a method of controlling therefor.

According to at least one embodiment of the present invention, it is able to provide a mobile terminal capable of reducing data capacity in a manner of generating a video by editing necessary section only from each of at least one video and a method of controlling therefor.

According to at least one embodiment of the present invention, it is able to provide a mobile terminal capable of controlling each video using an intuitive touch input inputted on a video list on which at least one video are displayed and a method of controlling therefor.

According to at least one embodiment of the present invention, it is able to provide a mobile terminal capable of watching a video and editing a video at the same time on a video list without separately executing a video editing application and a method of controlling therefor.

It is to be understood that both the foregoing general description and the following detailed description of the preferred embodiments of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a touch screen to display a video list that includes a plurality of videos; and
    a controller configured to:
        display a plurality of timelines corresponding to the plurality of videos based on a first input at the video list, wherein the plurality of timelines includes at least one of a start point indicator and an end point indicator to identify an editing section of the at least one video of the plurality of videos, and
        continuously play, on the touch screen, at least one of editing sections of the plurality of videos contained in the video list based on a second input at the video list, and
        display a playback option according to multi touch inputs inputted on an end point indicator of a first video and a start point indicator of a second video while displaying the video list, wherein the playback option includes both graphs corresponding to each scene transition of the first and second videos, and further both of the graphs change depending on the multi touch inputs,
        wherein the editing section of the first video and the editing section of the second video are combined with each other and form a video that is encoded, and in response to selecting of a specific icon within the playback option, the encoded video is stored in a memory.

2. The mobile terminal of claim 1, wherein the controller is further configured to change at least one of the start point indicator and the end point indicator of the editing section of the at least one video of the plurality of videos based on a third input at the displayed plurality of timelines.

3. The mobile terminal of claim 2, wherein the controller is further configured to display a thumbnail image of at least one frame adjacent to a point corresponding to the third input at the displayed plurality of timelines.

4. The mobile terminal of claim 1, wherein the controller is further configured to display, on the touch screen, a transition menu option in response to a third input at the at least one of the start point indicator and the end point indicator, wherein the transition menu option displays a scene transition effect of a video corresponding to the at least one of the start point indicator and the end point indicator.

5. The mobile terminal of claim 1, wherein the controller is further configured to delete, from the video list, a video corresponding to a position of a third input.

6. The mobile terminal of claim 5, wherein the controller is further configured to delete, from a memory, a video corresponding to a position of a fourth input.

7. The mobile terminal of claim 6, wherein the third input corresponds to an input being within a predetermined length range, and the fourth input corresponds to an input being less than the predetermined length range.

8. The mobile terminal of claim 1, wherein the controller is further configured to display, on the touch screen, the playback option that includes a combination of an editing section of the first video of the plurality of videos and an editing section of the second video of the plurality of videos based on a third input at the first video and the second video, wherein the playback option is displayed on the touch screen while the third input is being received at the touch screen.

9. The mobile terminal of claim 8, wherein the third input corresponds to an input at an end point indicator of the first video and a start point indicator of the second video.

10. The mobile terminal of claim 1, wherein the controller is further configured to display, on the touch screen, an editing option for scene transition of a first video to a second video of the plurality of videos based on a third input at the first video and the second video.

11. The mobile terminal of claim 10, wherein the controller is further configured to provide an additional editing option based on a fourth input at the displayed editing option for scene transition, the additional editing option to change a scene of the first video to the second video.

12. The mobile terminal of claim 10, wherein the controller is further configured to delete the editing option for scene transition of the first video to the second video from the video list based on a fifth input.

13. The mobile terminal of claim 12, wherein the third input corresponds to a pinch-in signal, and the fifth input corresponds to a pinch-out signal.

14. The mobile terminal of claim 1, wherein the displayed video list includes a thumbnail image representing each of the plurality of videos and video information.

15. The mobile terminal of claim 14, wherein the controller is further configured to play the editing section of a thumbnail image corresponding to the second input.

16. The mobile terminal of claim 15, wherein the controller is further configured to play the at least one of editing sections of the plurality of videos by magnifying the at least one of editing sections of the at least one videos based on a third input at the at least one of editing sections of the at least one videos that is being played.

17. The mobile terminal of claim 1, wherein the controller is further configured to store the at least one of editing sections of the plurality of videos based on an input at a displayed store icon.

18. A method of controlling a mobile terminal, comprising:
    receiving a first input at a video list that includes a plurality of videos;
    displaying a plurality of timelines corresponding to the plurality of videos based on the received first input, the displayed plurality of timelines including at least one of a start point indicator and an end point indicator to identify an editing section of the at least one video of the plurality of videos;
    receiving a second input at the displayed video list;
    continuously playing at least one of editing sections of the plurality of videos based on the received second input; and
    displaying a playback option according to multi touch inputs inputted on an end point indicator of a first video and a start point indicator of a second video while displaying the video list, wherein the playback option includes both graphs corresponding to each scene transition of the first and second videos, and further both of the graphs change depending on the multi touch inputs, wherein the editing section of the first video and the editing section of the second video are combined with each other and form a video that is encoded, and in response to selecting of a specific icon within the playback option, the encoded video is stored in a memory.

19. The method of claim 18, further comprising changing at least one of the start point indicator and the end point indicator of the editing section of the at least one video based on a third input at the displayed plurality of timelines.

20. The method of claim 19, further comprising displaying a thumbnail image of at least one frame adjacent to a point corresponding to the third input at the displayed plurality of timelines.

21. The method of claim 18, further comprising displaying a transition menu option in response to a third input at the at least one of the start point indicator and the end point indicator, wherein the transition menu option displays a scene transition effect of a video corresponding to the at least one of the start point indicator and the end point indicator.

22. The method of claim 18, further comprising displaying the playback option that includes a combination of an editing section of the first video of the plurality of videos and an editing section of the second video based on a third input at the first video and the second video, wherein the playback option is displayed while the third input is being received.

23. The method of claim 18, further comprising displaying an editing option for scene transition of a first video to a second video of the plurality of videos based on a third input at the first video and the second video.

24. The method of claim 18, further comprising continuously playing an editing section of a first video of the plurality of videos corresponding to a position of a third input at the video list and an editing section of a second video displayed after the first video.

* * * * *